US010514481B2

(12) United States Patent
Chang et al.

(10) Patent No.: US 10,514,481 B2
(45) Date of Patent: Dec. 24, 2019

(54) ANNULAR OPTICAL ELEMENT, IMAGING LENS MODULE AND ELECTRONIC DEVICE

(71) Applicant: LARGAN PRECISION CO., LTD., Taichung (TW)

(72) Inventors: Ming-Shun Chang, Taichung (TW); Cheng-Feng Lin, Taichung (TW); Ming-Ta Chou, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 155 days.

(21) Appl. No.: 15/869,385

(22) Filed: Jan. 12, 2018

(65) Prior Publication Data

US 2019/0018171 A1 Jan. 17, 2019

(30) Foreign Application Priority Data

Jul. 11, 2017 (TW) .............................. 106123242 A

(51) Int. Cl.
*G02B 5/02* (2006.01)
*G02B 7/02* (2006.01)
*G02B 13/00* (2006.01)
*G02B 27/62* (2006.01)

(52) U.S. Cl.
CPC ........... *G02B 5/0284* (2013.01); *G02B 7/021* (2013.01); *G02B 7/025* (2013.01); *G02B 7/026* (2013.01); *G02B 13/0055* (2013.01); *G02B 27/62* (2013.01)

(58) Field of Classification Search
CPC .......... G02B 7/02; G02B 7/021; G02B 7/025; G02B 7/022; G02B 7/026
USPC ......................................................... 359/819
See application file for complete search history.

(56) References Cited

U.S. PATENT DOCUMENTS

| 8,496,338 | B2* | 7/2013 | Ho ......................... G02B 5/005 |
| | | | 359/503 |
| 9,063,332 | B2* | 6/2015 | Kim ....................... G02B 1/116 |
| 9,354,444 | B2 | 5/2016 | Lin |
| 9,612,437 | B1 | 4/2017 | Chou et al. |
| 2012/0019905 | A1* | 1/2012 | Teraoka ................. G02B 7/021 |
| | | | 359/356 |

* cited by examiner

Primary Examiner — Mohammed A Hasan
(74) Attorney, Agent, or Firm — McClure, Qualey & Rodack, LLP

(57) ABSTRACT

An annular optical element having an optical axis includes an outer diameter surface, an inner annular surface, an object-side surface and an image-side surface. The object-side surface includes an annular reflecting surface, an annular auxiliary surface and a connecting surface. The annular reflecting surface is inclined with the optical axis. The annular auxiliary surface is closer to the optical axis than the annular reflecting surface is to the optical axis. The connecting surface is for connecting to an optical element, wherein the connecting surface is closer to the optical axis than the annular auxiliary surface is to the optical axis. The image-side surface is located opposite to the object-side surface and includes an annular optical surface. A V-shaped groove is formed by the annular auxiliary surface and the annular reflecting surface of the object-side surface.

23 Claims, 23 Drawing Sheets

ANNULAR OPTICAL ELEMENT, IMAGING LENS MODULE AND ELECTRONIC DEVICE

RELATED APPLICATIONS

This application claims priority to Taiwan Application Serial Number 106123242, filed Jul. 11, 2017, which is herein incorporated by reference.

BACKGROUND

Technical Field

The present disclosure relates to an annular optical element and an imaging lens module. More particularly, the present disclosure relates to an annular optical element and an imaging lens module which are applicable to portable electronic devices.

Description of Related Art

For the imaging lens modules equipped in the portable electronic devices, the optical elements disposed therein can be not only the lens elements for imaging purposes, but also the annular optical elements for maintaining the proper optical spacing among the lens elements or for fixedly disposing all the lens elements in the plastic barrel. Furthermore, regarding the types of assembling an annular optical element in a plastic barrel, the annular optical element may be abutted with the adjacent lens element or a surface of the plastic barrel without glue dispensing, or may be fixed with the adjacent lens element or the surface of the plastic barrel by glue dispensing.

For the annular optical element being fixed with the adjacent lens element or the surface of the plastic barrel by glue dispensing, the glue dispensing quality may be not well, for example, unevenly dispensing, insufficiently dispensing, blocking of the glue and so on may occur. It will result in the lens element being fixed with a deviation from the optical axis, and thereby affect the image quality of the entire imaging lens module. However, it is difficult to effectively verify the glue dispensing conditions in a narrow space between two surfaces visually or by a conventional image inspection method, as well as to establish an assembly acceptance criteria required for mass production. Accordingly, how to improve imaging lens modules and the annular optical elements therein, so as to provide an effective inspection method for the glue dispensing quality required for mass production, has become one of the important subjects.

SUMMARY

According to one aspect of the present disclosure, an annular optical element having an optical axis includes an outer diameter surface, an inner annular surface, an object-side surface and an image-side surface. The outer diameter surface surrounds the optical axis. The inner annular surface surrounds the optical axis and forms a central hole. The object-side surface connects the outer diameter surface and the inner annular surface, wherein the object-side surface includes an annular reflecting surface, an annular auxiliary surface and a connecting surface. The annular reflecting surface is inclined with the optical axis. The annular auxiliary surface is closer to the optical axis than the annular reflecting surface is to the optical axis. The connecting surface is for connecting to an optical element, wherein the connecting surface is closer to the optical axis than the annular auxiliary surface is to the optical axis. The image-side surface connects the outer diameter surface and the inner annular surface, wherein the image-side surface is located opposite to the object-side surface and includes an annular optical surface. A V-shaped groove is formed by the annular auxiliary surface and the annular reflecting surface, of the object-side surface. When an angle between the annular auxiliary surface and the annular reflecting surface is da, the following condition is satisfied: 39 degrees<da<89 degrees.

According to another aspect of the present disclosure, an imaging lens module includes the annular optical element according to the foregoing aspect, an optical lens assembly and a plastic barrel. The optical lens assembly includes a plurality of lens elements. The lens elements are disposed along the optical axis in the plastic barrel. The plastic barrel includes an object-end portion, an image-end portion and a tube portion. The object-end portion includes an outer object-end surface and an object-end opening. The image-end portion includes an outer image-end surface and an image-end opening. The tube portion connects the object-end portion and the image-end portion, wherein the tube portion includes a plurality of inner parallel surfaces, at least one of the inner parallel surfaces includes a plurality of stripe structures, the stripe structures are regularly arranged along a circumferential direction of the inner parallel surface, and the stripe structures are disposed correspondingly to the outer diameter surface of the annular optical element.

According to another aspect of the present disclosure, an electronic device includes the imaging lens module according to the foregoing aspect.

DETAILED DESCRIPTION

1st Embodiment

Figure 1A:
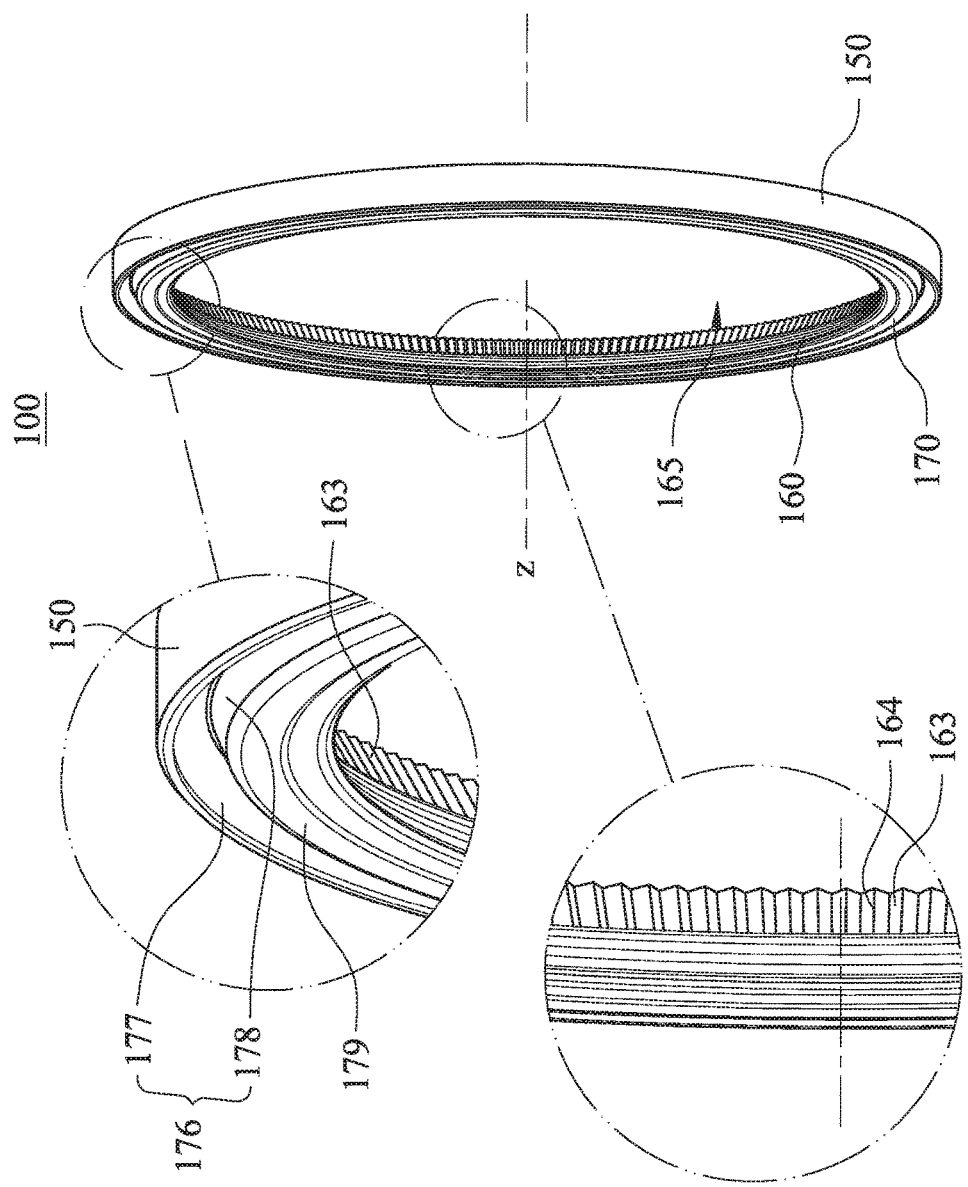
FIG. 1A is a three-dimensional view of an annular optical element according to the 1st embodiment of the present disclosure.
Figure 1B:
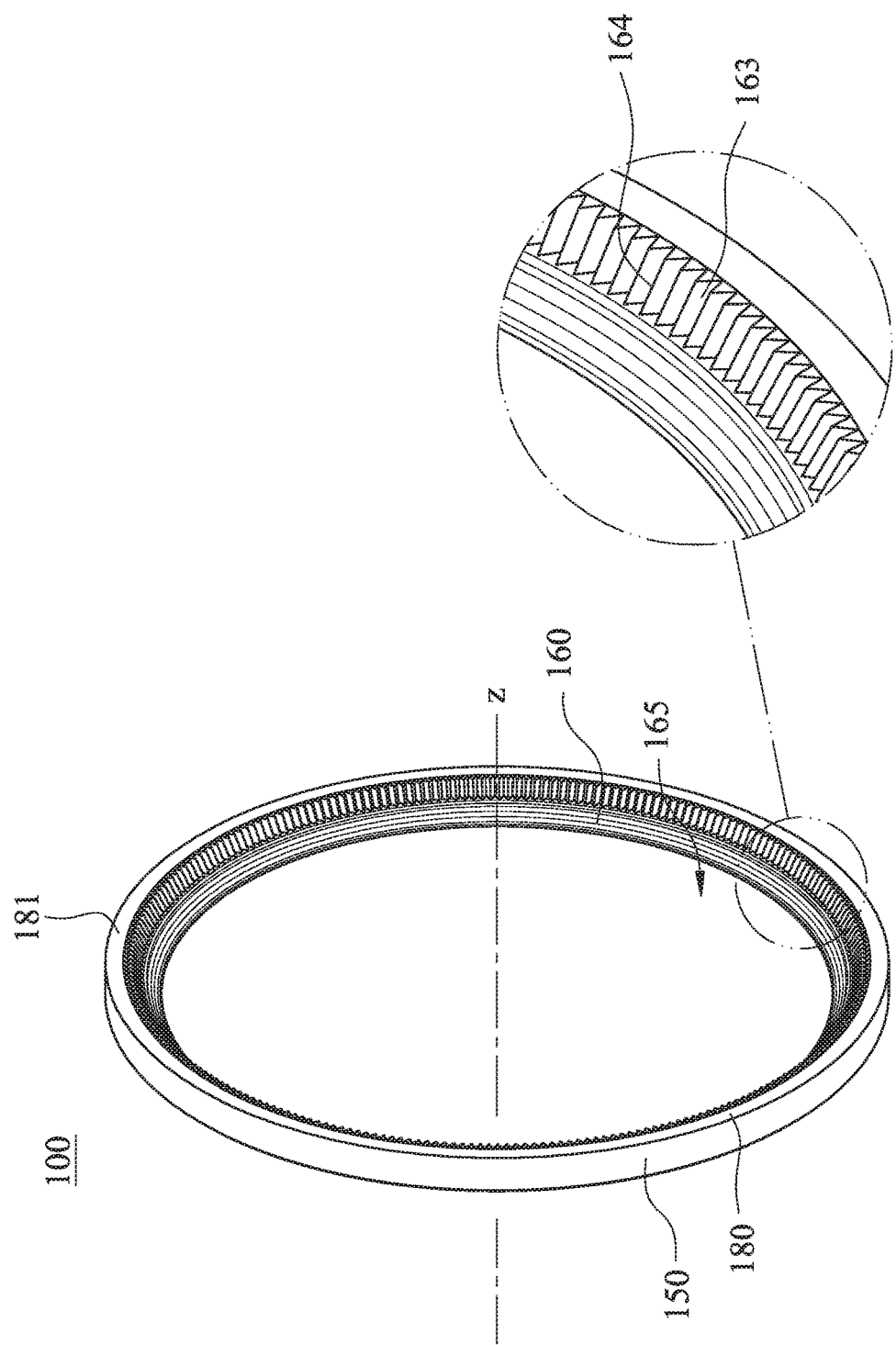
FIG. 1B is another three-dimensional view of the annular optical element according to the 1st embodiment.

FIG. 1A is a three-dimensional view of an annular optical element 100 according to the 1st embodiment of the present disclosure, wherein the view angle of FIG. 1A is towards an object-side surface 170 of the annular optical element 100. FIG. 1B is another three-dimensional view of the annular optical element 100 according to the 1st embodiment, wherein the view angle of FIG. 1B is towards an image-side surface 180 of the annular optical element 100. In FIG. 1A and FIG. 1B, the annular optical element 100 has an optical axis z, which is also a central axis of the annular optical element 100. The annular optical element 100 includes an outer diameter surface 150, an inner annular surface 160, the object-side surface 170 and the image-side surface 180. The outer diameter surface 150 surrounds the optical axis z. The inner annular surface 160 surrounds the optical axis z and forms a central hole 165, i.e. the central hole 165 is enclosed by the inner annular surface 160. Furthermore, when the annular optical element 100 is applied in the imaging lens module (not shown herein), the object-side surface 170 faces an imaged object of the imaging lens module, and the image-side surface 180 faces an image surface of the imaging lens module.

Figure 1C:
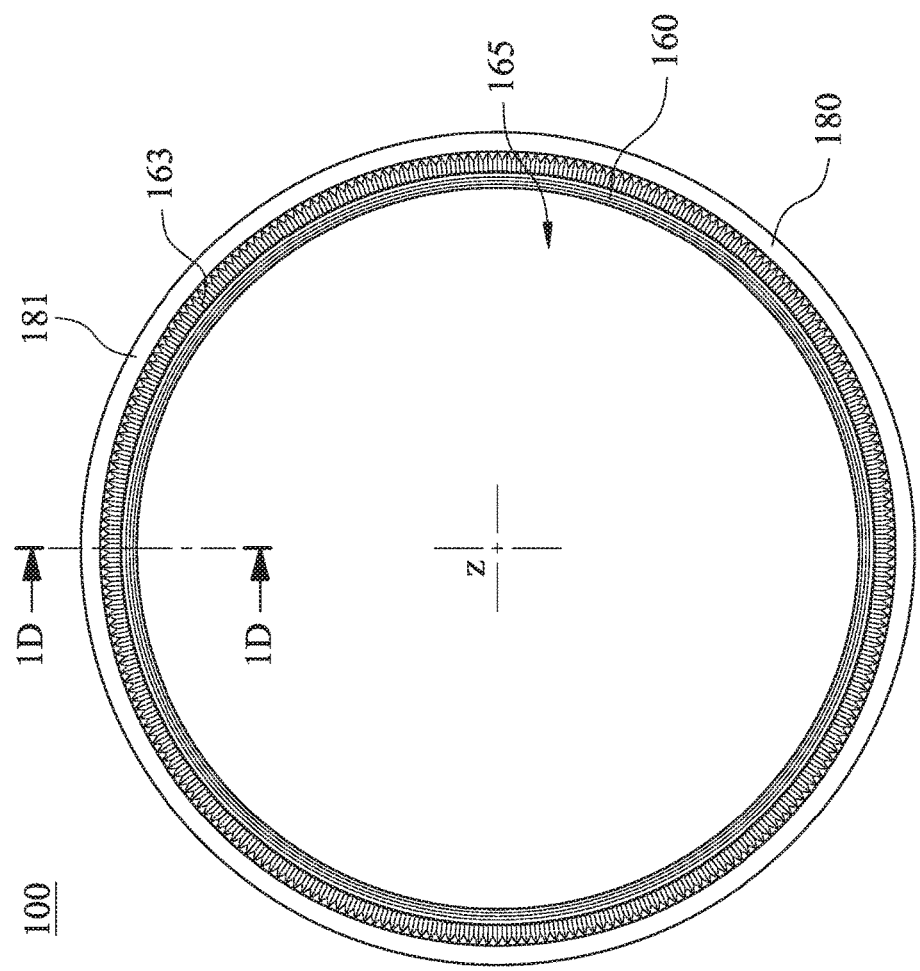
FIG. 1C is a plane view of the annular optical element according to the 1st embodiment.
Figure 1D:
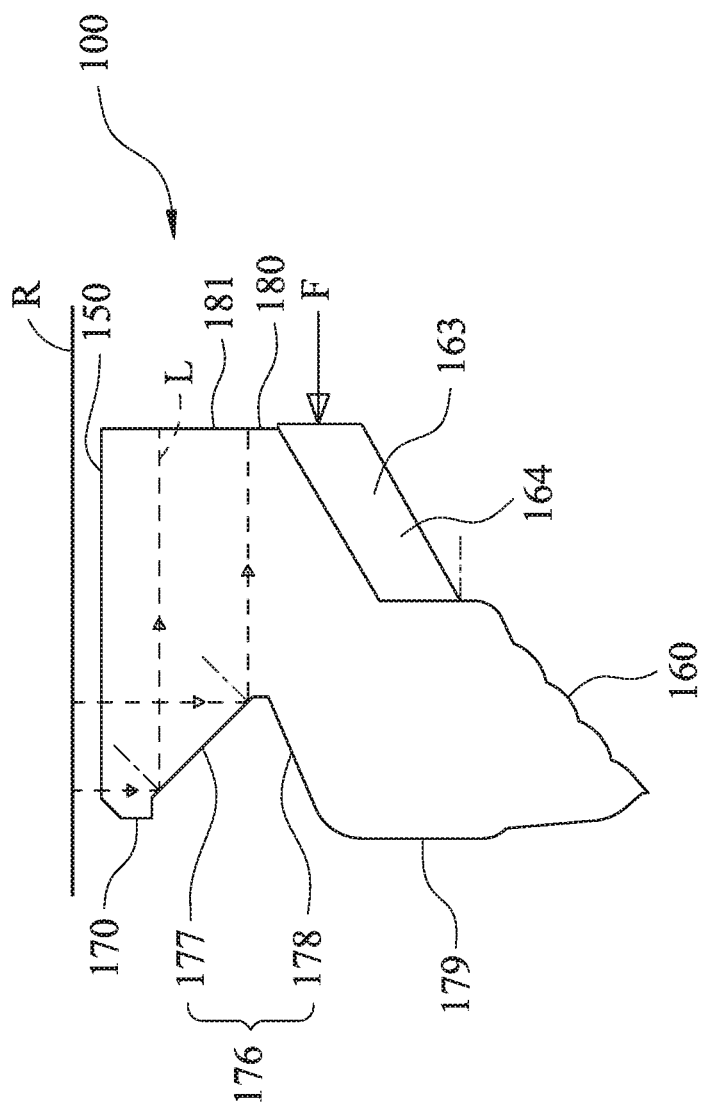
FIG. 1D is a schematic view of a cross-sectional plane along line 1D-1D of the annular optical element according to FIG. 1C and an adjacent surface.

FIG. 1C is a plane view of the annular optical element 100 according to the 1st embodiment, and FIG. 1D is a schematic view of a cross-sectional plane along a line 1D-1D of the annular optical element 100 according to FIG. 1C and an adjacent surface R, wherein the extension of the line 10-1D passes through the optical axis z. In the 1st embodiment, the annular optical element 100 has a circularly annular shape with respect to the optical axis z. That is, all specific cross-sectional planes of the annular optical element 100 are the same, wherein each of the specific cross-sectional planes passes through the optical axis z, a normal direction of each of the specific cross-sectional planes is vertical to the optical axis z, and half of each of the specific cross-sectional planes is shown as FIG. 1D. Furthermore, in order to more clearly show the annular optical element 100 according to the 1st embodiment, the other half, which is symmetrical with the half shown in FIG. 10 relative to the optical axis z, of each of the specific cross-sectional planes is omitted in FIG. 1D. In other embodiments according to the present disclosure (not shown in drawings), the annular optical element may have a non-circularly annular shape with respect to the optical axis.

In FIG. 1A to FIG. 10, the object-side surface 170 connects the outer diameter surface 150 and the inner annular surface 160, wherein the object-side surface 170 includes an annular reflecting surface 177, an annular auxiliary surface 178 and a connecting surface 179. The annular reflecting surface 177 is inclined with the optical axis z. That is, the annular reflecting surface 177 is neither vertical nor parallel to the optical axis z, and the annular reflecting surface 177 is a circular conical surface with respect to the optical axis z. The annular auxiliary surface 178 is closer to the optical axis z than the annular reflecting surface 177 is to the optical axis z. The connecting surface 179 is for connecting to an optical element (not shown herein) of the imaging lens module, wherein the connecting surface 179 is closer to the optical axis z than the annular auxiliary surface 178 is to the optical axis z. That is, the annular reflecting surface 177, the annular auxiliary surface 178 and the connecting surface 179 are formed on the object-side surface 170 in order from the outer diameter surface 150 to the optical axis z. Furthermore, the optical element of the imaging lens module may be a lens element, an imaging compensation element, a light blocking sheet, a spacer, a retainer or so on, wherein an annular optical element particularly indicates the spacer or the retainer.

Figure 1F:
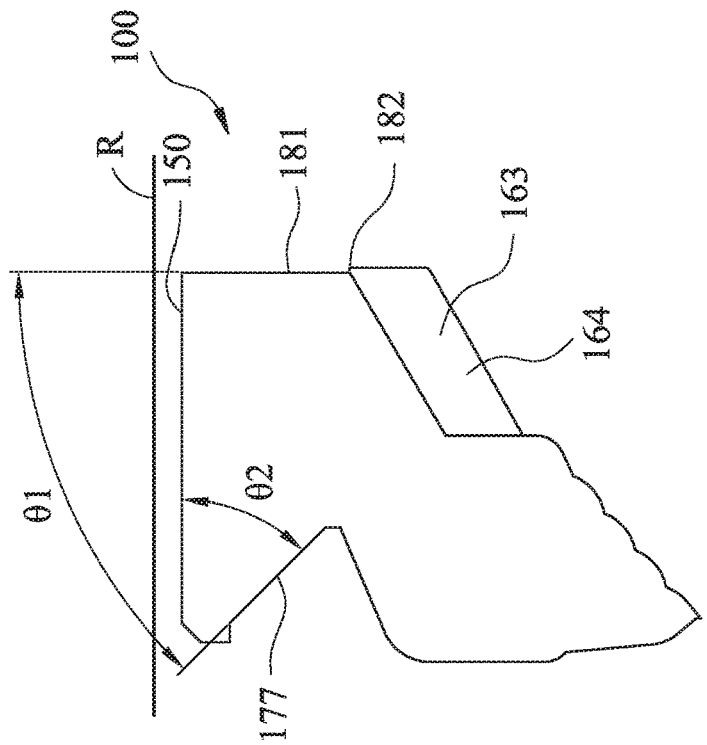
FIG. 1F is another schematic view of the parameters according to FIG. 1D.
Figure 1E:
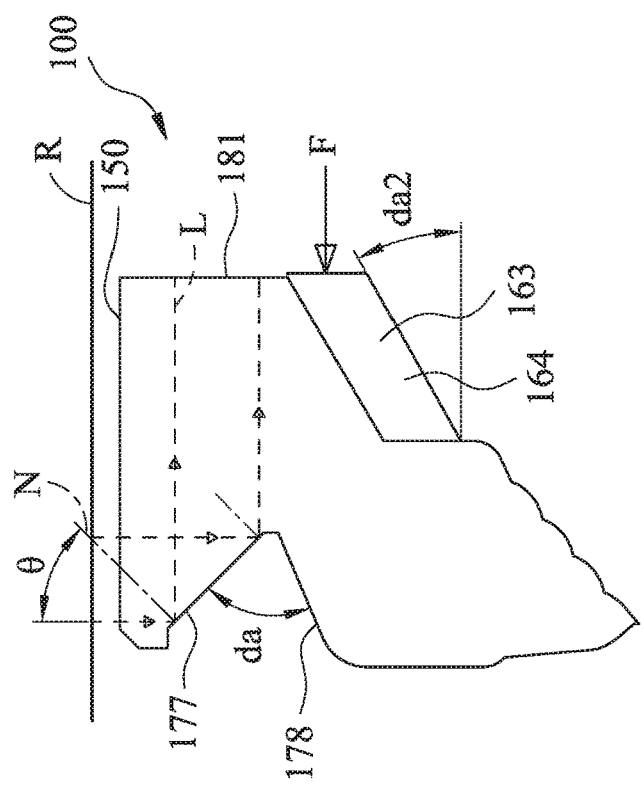
FIG. 1E is a schematic view of the parameters according to FIG. 1D.

FIG. 1E is a schematic view of the parameters according to FIG. 1D. In FIG. 1D and FIG. 1E, the image-side surface 180 connects the outer diameter surface 150 and the inner annular surface 160, wherein the image-side surface 180 is located opposite to the object-side surface 170 and includes an annular optical surface 181. It can be said that the annular optical surface 181 is formed on the image-side surface 180. A V-shaped groove 176 is formed by the annular auxiliary surface 178 and the annular reflecting surface 177 of the object-side surface 170. Therefore, the annular auxiliary surface 178 is advantageous to the annular optical element 100 to maintain the entire surface flatness during a molding process (such as an injection molding process) and an assembling process, reduce warpage and partial shrinkage of a surface, and provide the structural strength to protect the flatness and the optical properties of the annular optical surface 181 and the annular reflecting surface 177. Moreover, the annular auxiliary surface 178 is beneficial for the annular reflecting surface 177 to be a total reflection surface for an inspection light L. Specifically, when the inspection light L with a specific wavelength is able to penetrate and enter into the annular optical element 100, the inspection light L from the outer diameter surface 150 is able to be totally reflected from the annular reflecting surface 177 and forms an image on the annular optical surface 181. That is, it enables the inspection light L is observed visually or by an image inspection equipment. For example, it is shown as the inspection light L and an arrow direction thereof in FIG. 1D and FIG. 1E.

In FIG. 1D and FIG. 1E, it is further interpreted that according to the optical principles of the total reflection, the inspection light L, which is able to penetrate and enter into the annular optical element 100, is incident on the annular reflecting surface 177, and thereby the annular reflecting surface 177 is an interface between the annular optical element 100 and the air. The annular optical element 100 with relatively high refractive index is optically denser medium, and the air with relatively low refractive index is optically less dense medium. When the inspection light L is incident on the annular reflecting surface 177 with an incident angle θ being greater than a critical angle of the annular optical element 100, the inspection light L would be totally reflected from the annular reflecting surface 177. That is, the inspection light L would not be refracted to enter into the air from the annular reflecting surface 177. The incident angle θ is an angle between the inspection light L and a normal direction N of the annular reflecting surface 177. The critical angle is dependent on and varies with a wavelength of the inspection light L, a refractive index of optically denser medium and a refractive index of optically less dense medium, wherein the optically less dense medium for determining a critical angle of the present disclosure is the air. In addition, it should be understood that the optical properties of the annular optical element 100 described in the present disclosure are not only for the inspection light L being used for inspecting the assembling quality of the imaging lens module, but also for light being used for other purposes.

When an angle (indicating the one smaller than or equal to 90 degrees) between the annular auxiliary surface 178 and the annular reflecting surface 177 is da, that is, the angle da is defined by the V-shaped groove 176, the following condition is satisfied: 39 degrees<da<89 degrees. Therefore, it is favorable for increasing the supporting strength of the annular optical element 100 so as to prevent the annular reflecting surface 177 from flatness being affected by an external force (such as a pressing force F in FIG. 1D and FIG. 1E) during the assembling process of the imaging lens module. Preferably, the following condition may be satisfied: 39 degrees<da<80 degrees.

In detail, the annular optical element 100 with the annular reflecting surface 177 and the annular optical surface 181 may be formed integrally and made by an injection molding method, Therefore, it is favorable for increasing the production efficiency, and preventing the compact imaging lens module from adding additional parts and space. In other embodiments (not shown in drawings) according to the present disclosure, an annular optical element with an annular reflecting surface and an annular optical surface may be made by other methods, such as machining, 3D printing or other molding methods, but not limited thereto.

The inspection light L can be totally reflected from the annular reflecting surface 177, that is, the annular reflecting surface 177 can be provided for the inspection light L to be totally reflected therefrom, wherein the inspection light L may be visible light within a wavelength range from 400 nm to 700 nm or infrared light within a wavelength range from 700 nm to 1000 nm. Accordingly, the inspection light L would be totally reflected from the annular reflecting surface 177 of the annular optical element 100 according to the present disclosure by adjusting the inspection light L with a wavelength to penetrate and enter into the annular optical element 100, and adjusting the inspection light L with an incident angle θ on the annular reflecting surface 177. Therefore, it is favorable for the inspection light L with even a weak intensity to completely transmit to the annular optical surface 181 from the annular reflecting surface 177, so as to increase the identification clarity of an inspection image (an image of the inspection light L observed on the annular optical surface 181).

The inspection light L can penetrate the annular optical surface 181, and can be reflected from the annular reflecting surface 177 to the outer diameter surface 150. That is, the annular optical surface 181 may be provided for the inspection light L to transmit through the annular optical surface 181, and the annular reflecting surface 177 may be provided for the inspection light L to be reflected from the annular reflecting surface 177 to the outer diameter surface 150. Therefore, it enables that the inspection light L from the air is incident on the annular optical surface 181, and the inspection image from the annular optical element 100 is received on the annular optical surface 181 too, so that the emitting of the inspection light. L and a monitoring camera of the image inspection equipment could operate simultaneously. It is favorable for adjusting a source brightness of the inspection light L as needed while observing the inspection image on the annular optical surface 181 by the monitoring camera, so as to enhance the identification results of the inspection image.

Based on the descriptions of the last paragraph, the annular optical element 100 can provide further application. Specifically, the inspection light L can be reflected from the adjacent surface R to the outer diameter surface 150 and then to the annular reflecting surface 177, and totally reflected from the annular reflecting surface 177 to the annular optical surface 181. Thus, the structural properties of the adjacent surface R and the outer diameter surface 150 could be observed via the inspection image on the annular optical surface 181.

More specifically, in FIG. 1D and FIG. 1E, the adjacent surface R is smooth and bright, and disposed adjacent to the outer diameter surface 150. When the annular optical element 100 is assembled in a plastic barrel of the imaging lens module, an inner surface of the plastic barrel may be the adjacent surface R for the annular optical element 100. The outer diameter surface 150 and the adjacent surface R may be substantially parallel to each other, wherein there may be small air gaps between the outer diameter surface 150 and the adjacent surface R, or the outer diameter surface 150 and the adjacent surface R may be connected to each other. Moreover, the annular optical element 100 can be a retainer used for fixedly disposing a plurality of lens elements in the plastic barrel of the imaging lens module.

When the inspection light L with a wavelength is able to penetrate and enter into the annular optical element 100, the inspection light L can be incident on the annular optical surface 181 with an incident angle equal to or approaching zero degrees, and enter into the annular optical element 100, wherein the annular optical surface 181 is vertical to the optical axis z of the annular optical element 100. Then the inspection light L can be incident on the annular reflecting surface 177, wherein an incident angle on the annular reflecting surface 177 of the inspection light L is greater than a critical angle of the annular optical element 100, and the inspection light L can be totally reflected from the annular reflecting surface 177 to the outer diameter surface 150. An incident angle on the outer diameter surface 150 of the inspection light L is equal to or approaching zero degrees.

Then the inspection light L transmits through the outer diameter surface 150 and would be incident on the adjacent surface R with an incident angle equal to or approaching zero degrees. The path of the inspection light L, as an example, described in this paragraph is not shown in drawings, but may be along a reverse arrow direction in FIG. 1D and FIG. 1E.

Furthermore, the adjacent surface R may have proper optical and structural properties so that the inspection light L can be almost reflected from the adjacent surface R to the outer diameter surface 150, wherein the proper optical and structural properties can be a material of the adjacent surface R being nontransparent to the inspection light L (i.e. a transmittance of the adjacent surface R for the inspection light L is smaller than 50%), the adjacent surface R being smooth and bright, the adjacent surface R being parallel to the outer diameter surface 150 and so on. The inspection light L reflected from the adjacent surface R varies with and is dependent on the structural properties of the adjacent surface R and the outer diameter surface 150, such as the sizes of the air gaps between the adjacent surface R and the outer diameter surface 150, the roughness of the adjacent surface R, the roughness of the outer diameter surface 150 and so on. Thus, the inspection images observed on the annular optical surface 181, which are resulted from and corresponding to different structural properties of the adjacent surface R and the outer diameter surface 150, have distinguishable differences.

Next, the inspection light L reflected from the adjacent surface R can transmit through the outer diameter surface 150 with an incident angle equal to or approaching zero degrees. Then the inspection light L can be incident on the annular reflecting surface 177 with the incident angle θ, and totally reflected from the annular reflecting surface 177 to transmit through and be shown as the inspection image on the annular optical surface 181 with an incident angle equal to or approaching zero degrees. The path of the inspection light L, as an example, described in this paragraph may be shown as the arrow direction in FIG. 1D and FIG. 1E. Therefore, it is favorable for observing the inspection image on the annular optical surface 181 visually or by the image inspection equipment, wherein the differences of the inspection image are distinguishable and corresponding to different structural properties of the adjacent surface R and the outer diameter surface 150. Furthermore, it should be understood that the path of the inspection light L according to the aforementioned descriptions, FIG. 1D and FIG. 1E is just an example among various possible paths, while an inspection light is applied to the annular optical element 100.

In addition, it should be understood that the annular reflecting surface of the annular optical element according to the present disclosure is able to be a total reflection surface for an inspection light, and further applied in inspecting the assembling properties of any surface with its adjacent surface. The implemental details should not be limited by the specific structures and materials disclosed by the annular optical element 100 of the 1st embodiment, and incident angles on surfaces and paths of the inspection light should not be limited by those disclosed in FIG. 1D and FIG. 1E. Furthermore, the inspection light may have a smallest attenuation between being incident into and transmitting out of the annular optical element by adjusting the related properties of the annular optical element and the inspection light. Thus, in other embodiments according to the present disclosure (not shown herein), an annular optical surface of an annular optical element may be not vertical to an optical axis thereof. Moreover, in other applications of an annular optical element according to the present disclosure (not shown herein), incident angles on an annular optical surface, an outer diameter surface and an adjacent surface of an inspection light may be not zero degrees. An outer diameter surface and an adjacent surface may be not parallel to each other. Paths of the inspection light before being incident on the adjacent surface and after being reflected from the adjacent surface may be different.

The V-shaped groove 176 may be tapered from the object-side surface 170 towards the image-side surface 180. That is, a tapered direction of the V-shaped groove 176 is neither towards the outer diameter surface 150 nor towards the inner annular surface 160. Therefore, it is favorable for providing a proper release angle for the object-side surface 170 during the injection molding process of the annular optical element 100.

FIG. 1F is another schematic view of the parameters according to FIG. 1a In FIG. 1F, when an angle (indicating the one smaller than or equal to 90 degrees) between the annular optical surface 181 and the annular reflecting surface 177 is θ1, the following condition may be satisfied: 31 degrees<θ1<55 degrees. Therefore, it is favorable for maintaining the thickness of the annular optical element 100, and ensuring the inspection light L to be reflected from the annular reflecting surface 177 to smoothly transmit through the annular optical surface 181.

When an angle (indicating the one smaller than or equal to 90 degrees) between the annular reflecting surface 177 and the outer diameter surface 150 is θ2, the following condition may be satisfied: 31 degrees<θ2<60 degrees. Therefore, it is favorable for preventing the annular optical element 100 from thickness unevenness, which would results in warpage or shrinkage of the annular optical element 100.

In FIG. 1D and FIG. 1E, the annular optical element 100 may be made of a transparent and colorless plastic material, and transparent to visible light. That is, a transmittance of the annular optical element 100 for visible light is greater than 50%. Therefore, it allows visible light within a wavelength range from 400 nm to 700 nm is used as the inspection light L, and it is advantageous in visually observing the inspection image and subsequently calibrating the screening criteria for the inspection equipment to reduce the equipment misjudgments. Furthermore, it particularly indicates that the annular optical element 100 is transparent to visible light with a wavelength of 587.6 nm, and thereby visible light with a wavelength of 687.6 nm can be used as the inspection light L. In the 1st embodiment, the annular optical element 100 is made of a transparent and colorless plastic material, and transparent to visible light.

In addition, the annular optical element 100 may be also transparent to infrared light. That is, a transmittance of the annular optical element 100 for infrared light is greater than 50%. Accordingly, it allows infrared light within a wavelength range from 700 nm to 1000 nm can be used as the inspection light L, and specifically infrared light with a wavelength of 780 nm can be used. Therefore, infrared light being used as the inspection light L is advantageous in avoiding a conflict with visible light and thereby simultaneously inspecting the image quality and assembling quality of the imaging lens module.

When a refractive index of the annular optical element 100 for a light with a wavelength of 587.6 nm (i.e. d-line) is nd, the following condition may be satisfied: $1.42 < nd < 1.68$. A refractive index nd satisfying the aforementioned range is corresponding to a smaller critical angle, and thereby it is favorable for the inspection light L to be totally reflected in the annular optical element 100, transmit with lower loss, and more easily transmit through the annular optical surface 181 after being reflected from the adjacent surface R. In practice, a refractive index measured for a light with a wavelength of 587.56 nm may be taken as a refractive index of d-line.

When the angle between the annular reflecting surface 177 and the outer diameter surface 150 is θ2, and a critical angle of the annular optical element 100 for a light with a wavelength of 780 nm is θc1, the following condition may be satisfied: θ2>θc1. Therefore, it is favorable for more completely reflecting the inspection light L via a total reflection and thereby providing the inspection image being clearer. Furthermore, a refractive index of the annular optical element 100 for a light with a wavelength of 780 nm can be measured by a measurement system, and then the critical angle θc1 of the annular optical element 100 for a light with a wavelength of 780 nm can be derived. Alternately, the critical angle θc1 can be obtained by an experiment. That may be, a light with a wavelength of 780 nm is incident on the annular optical element 100 with various incident angles one by one, and measurements are respectively performed to verify if the total reflection occurs. Then a range or a value approaching the critical angle θc1 of the annular optical element 100 for a light with a wavelength of 780 nm can be obtained, and if the condition of "θ2>θc1" between the angle θ2 and the critical angle θc1 is satisfied can be subsequently verified. In the 1st embodiment, the condition of "θ2>θc1" between the angle θ2 and the critical angle θc1 is satisfied.

Specifically, the annular optical element 100 is made of a transparent and colorless plastic material, wherein refractive indices of the annular optical element 100 for lights with different wavelengths are shown as the following Table 1.1. According to Table 1.1, a critical angle θc2 of the annular optical element 100 for a light with a wavelength of 700 nm and a critical angle θc3 of the annular optical element 100 for a light with a wavelength of 587.56 nm can be derived from the following Equation (1.1) and Equation (1.2) respectively, wherein parameter Nair represents a refractive index of the air for a light with a corresponding wavelength, parameter N-IR represents a refractive index of the annular optical element 100 for a light with a wavelength of 700 nm, and parameter N-Vis represents a refractive index of the annular optical element 100 for a light with a wavelength of 587.56 nm. It should be understood critical angles of the annular optical element 100 for lights with other wavelengths respectively can be derived according to Equation (1.1) and Equation (1.2) by analogy, and thereby those are omitted in Table 11. In practice, a refractive index measured for a light with a wavelength of 706.519 nm may be taken as a refractive index of a light with a wavelength of 700 nm, and a refractive index measured for a fight with a wavelength of 404.656 nm may be taken as a refractive index of a light with a wavelength of 400 nm.

TABLE 1.1

Annular optical element 100 of 1st embodiment

| | Wavelength (nm) | | | | |
|---|---|---|---|---|---|
| | 700 | 656.27 | 587.56 | 486.13 | 400 |
| Refractive index | 1.574 | 1.577 | 1.582 | 1.596 | 1.618 |
| Critical angle (deg.) | 39.45 | | 39.19 | | |

$$\theta c2 = \sin^{-1}\left(\frac{Nair}{N-IR}\right) = \sin^{-1}\left(\frac{1}{1.574}\right) = 39.45° \quad (1.1)$$

$$\theta c3 = \sin^{-1}\left(\frac{Nair}{N-Vis}\right) = \sin^{-1}\left(\frac{1}{1.582}\right) = 39.19° \quad (1.2)$$

When an Abbe number of the annular optical element 100 is Vd, the following condition may be satisfied: 15<Vd<35. Therefore, the Abbe number Vd being smaller is advantageous in achieving a better ability of light refraction of the annular optical element 100 so as to maintain the compact size of the annular optical element 100.

The annular optical surface 181 may have a specular property. When a surface roughness of the annular optical surface 181 is Ra1, the following condition may be satisfied: 0.005a≤Ra1<0.05a. Therefore, the annular optical surface 181 being smoother is advantageous in more easily observing visually a connecting condition between the outer diameter surface 150 and the adjacent surface R (such as the inner surface of the plastic barrel) so as to reduce the misjudgments. Preferably, the following condition may be satisfied: 0.005a<Ra1<0.025a.

Values of the surface roughness (Ra) commonly used with the corresponding size range are listed as the following Table 1.2. The surface roughness (Ra) smaller than 0.012a approaches an ideal specular property, so as to be difficult to accurately measure the corresponding size range by the common measurement systems and not to be listed in Table 1.2.

TABLE 1.2

Surface roughness (Ra)

| Size range (μm) | Surface roughness (Ra) |
|---|---|
| 0.01~0.015 | 0.012a |
| 0.02~0.03 | 0.025a |
| 0.04~0.06 | 0.05a |
| 0.08~0.11 | 0.1a |
| 0.17~0.22 | 0.2a |
| 0.33~0.45 | 0.4a |
| 0.66~0.90 | 0.8a |

The annular reflecting surface 177 may have the specular property. When a surface roughness of the annular reflecting surface 177 is Ra2, the following condition may be satisfied: 0.005a=Ra2<0.05a. Therefore, the annular reflecting surface 177 with a better surface property is advantageous to the inspection light L to have less loss during transmitting in the annular optical element 100, and the production efficiency to be improved while the annular reflecting surface 177 being not required to be plated with aluminum or silver. Preferably, the following condition may be satisfied: 0.005a<Ra2<0.025a.

The outer diameter surface 150 may have the specular property. When a surface roughness of the outer diameter surface 150 is Ra3, the following condition may be satisfied: 0.005a≤Ra3<0.05a. Therefore, the outer diameter surface 150 being smoother is advantageous in providing the inspection image to be clearer. If the outer diameter surface 150 has a greater surface roughness, it would affect the transmission of the inspection light L so as to result in the inspection image with a weak brightness. Preferably, the following condition may be satisfied: 0.005a<Ra3<0.025a.

Specifically, the inspection light L from the outer diameter surface 150 is totally reflected from the annular reflecting surface 177 to be incident on the annular optical surface 181, wherein a surface property of the outer diameter surface 150 is quite similar to a surface property of the annular optical surface 181. Furthermore, all of the annular reflecting surface 177, the outer diameter surface 150 and the annular optical surface 181 have the same or similar surface properties being smooth and bright, which are directly transferred from respectively corresponding surface properties of the injection molding molds, while the outer diameter surface 150 may have flash on edges resulted from the injection molding molds.

In FIG. 1A to FIG. 1D, the inner annular surface 160 may include an adjusting structure 163 extended towards the image-side surface 180, and the adjusting structure 163 is closer to the optical axis z than the annular optical surface 181 is to the optical axis z. When an angle (indicating the one smaller than or equal to 90 degrees) between the adjusting structure 163 and the optical axis z is da2, the following condition may be satisfied: 13 degrees da2<45 degrees. The annular optical element 100 is temporarily pressed by the assembling jig while the annular optical element 100 and other optical elements being connected and assembled in the imaging lens module, wherein a pressing position on the annular optical element 100 may be shown as the pressing force F in FIG. 1D and FIG. 1E. Therefore, the adjusting structure 163 is advantageous to the annular optical element 100 to maintain the entire surface flatness during the molding process and the assembling process, reduce warpage and partial shrinkage of a surface resulted from an external force. Furthermore, the adjusting structure 163 and the annular auxiliary surface 178 are able to provide the structural strength to protect the flatness and the optical properties of the annular optical surface 181 and the annular reflecting surface 177. The angle da2 satisfying the aforementioned range is beneficial for the trends of the imaging lens module with greater chief ray angle (CRA) today.

The adjusting structure 163 may include a plurality of strip-shaped structures 164 extended from the object-side surface 170 towards the image-side surface 180. Therefore, the structures and the shapes of the strip-shaped structures 164 are featured with better supporting properties, so that the annular optical surface 181 is able to withstand the pressing force F (shown as FIG. 1D and FIG. 1E) being inevitable during the assembling process of the imaging lens module. Furthermore, the strip-shaped structures 164 may be adjacent to the annular optical surface 181, so that the strip-shaped structures 164 are advantageous in maintaining the flatness of the annular optical surface 181 during the injection molding process of the annular optical element 100. That is, the distortion of the inspection image can be effectively decreased while the dents and shrinkages of the annular optical surface 181 being reduced. In the 1st embodiment, the adjusting structure 163 includes the strip-shaped structures 164, and it could be said that the adjusting structure 163 is formed with the strip-shaped structures 164. The strip-shaped structures 164 are extended from the object-side surface 170 towards the image-side surface 180, and the adjusting structure 163 with the strip-shaped structures 164 is located on the inner annular surface 160 and the image-side surface 180 simultaneously. The strip-shaped structures 164 are adjacent to and slightly protruded more than the annular optical surface 181.

Each of the strip-shaped structures 164 may have a wedge shape. The wedge shape is a tapered end structure, which has similar effects as the release angle concerned in the injection molding process. A plastic product being too thick made by a molding method may have shrinkage problems. The wedge shape of each of the strip-shaped structures 164 is beneficial for reducing the thickness of part related to the annular optical surface 181, so as to reduce the shrinkage problems and increase the flatness of the annular optical surface 181 being made by the injection molding method, and decrease the dents and distortions thereof. Furthermore, the strip-shaped structures 164 having wedge shapes are featured with better supporting properties, so that it is favorable for increasing the overall strength of the annular optical element 100 to withstand the force from the assembling equipment for the imaging lens module.

When a number of the strip-shaped structures 164 is N1, the following condition may be satisfied: 60<N1<400. Therefore, the denseness of the strip-shaped structures 164 with the number N1 satisfying the aforementioned range are featured with better supporting properties and favorable for effectively adjusting the flatness of the annular optical surface 181.

Each of the strip-shaped structures 164 may have the specular property. When a surface roughness of each of the strip-shaped structures 164 is Ra4, the following condition may be satisfied: $0.005a \leq Ra4 < 0.05a$. The stray light has been hardly generated from the adjusting structure 163 with the strip-shaped structures 164. Therefore, the surface roughness Ra4 being adjusted to satisfy the aforementioned range is further favorable for omitting the surface processing procedure of light diminishing so as to raise the production efficiency.

In FIG. 1F, a vertical parting molding structure 182 may be located between the annular optical surface 181 and the adjusting structure 163. Therefore, during the injection molding process of the annular optical element 100, the shape of the adjusting structure 163 is advantageous in maintaining the flatness of the annular optical surface 181, and reducing the warpage and tilt conditions of the entire annular optical surface 181. Specifically, the vertical parting molding structure 182 is located on the boundary between the annular optical surface 181 and the adjusting structure 163, and is an annular stepped structure formed by the protruding differences between the strip-shaped structures 164 and the annular optical surface 181 (the strip-shaped structures 164 being protruded more than the annular optical surface 181).

Figure 1G:
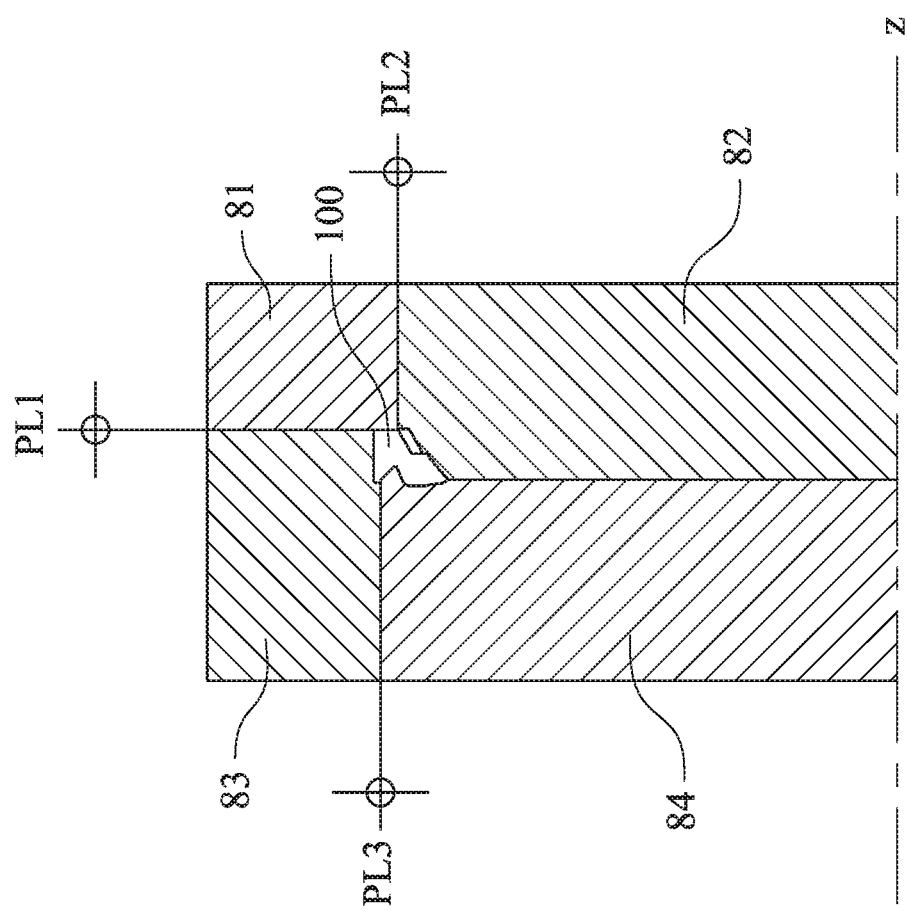
FIG. 1G is a schematic view of molds of the annular optical element according to the 1st embodiment.

FIG. 1G is a schematic view of molds 81, 82, 83 and 84 of the annular optical element 100 according to the 1st embodiment, wherein the other halves of the molds 81, 82, 83 and 84 respectively, which are symmetrical with the halves shown in the FIG. 1G relative to the optical axis z, are omitted therein. In FIG. 1F and FIG. 1G, an annular mold cavity is formed by the molds 81, 82, 83 and 84, and the annular optical element 100 is formed in the annular mold cavity by the injection molding method. There is a horizontal parting surface PL1 between the molds 81 and 83, wherein the horizontal parting surface PL1 is vertical to the optical axis z and acts as a main parting surface for the annular optical element 100. In addition, there are a vertical parting surface PL2 between the molds 81 and 82, and a vertical parting surface PL3 between the molds 83 and 84, wherein the vertical parting surfaces PL2 and PL3 are both vertical to the horizontal parting surface PL1, and the vertical parting molding structure 182 is formed by the arrangement of the vertical parting surface PL2. The arrangements of the horizontal parting surface PL1, the vertical parting surfaces PL2 and PL3 are beneficial to increase the dimensional accuracy of the annular optical element 100.

The data of the aforementioned parameters of the annular optical element 100 according to the 1st embodiment of the present disclosure are listed in the following Table 1.3, wherein the parameters are also shown as FIG. 1E and FIG. 1F.

TABLE 1.3

1st embodiment

| da (deg.) | 68 | nd | 1.582 |
|---|---|---|---|
| da2 (deg.) | 29.18 | Vd | 30.2 |
| θ (deg.) | 45 | Ra1 | 0.025a |
| θ1 (deg.) | 45 | Ra2 | 0.025a |
| θ2 (deg.) | 45 | Ra3 | 0.005a~0.05a |
| θc2 (deg.) | 39.45 | Ra4 | 0.005a~0.05a |
| θc3 (deg.) | 39.19 | N1 | 240 |

2nd Embodiment

Figure 2A:
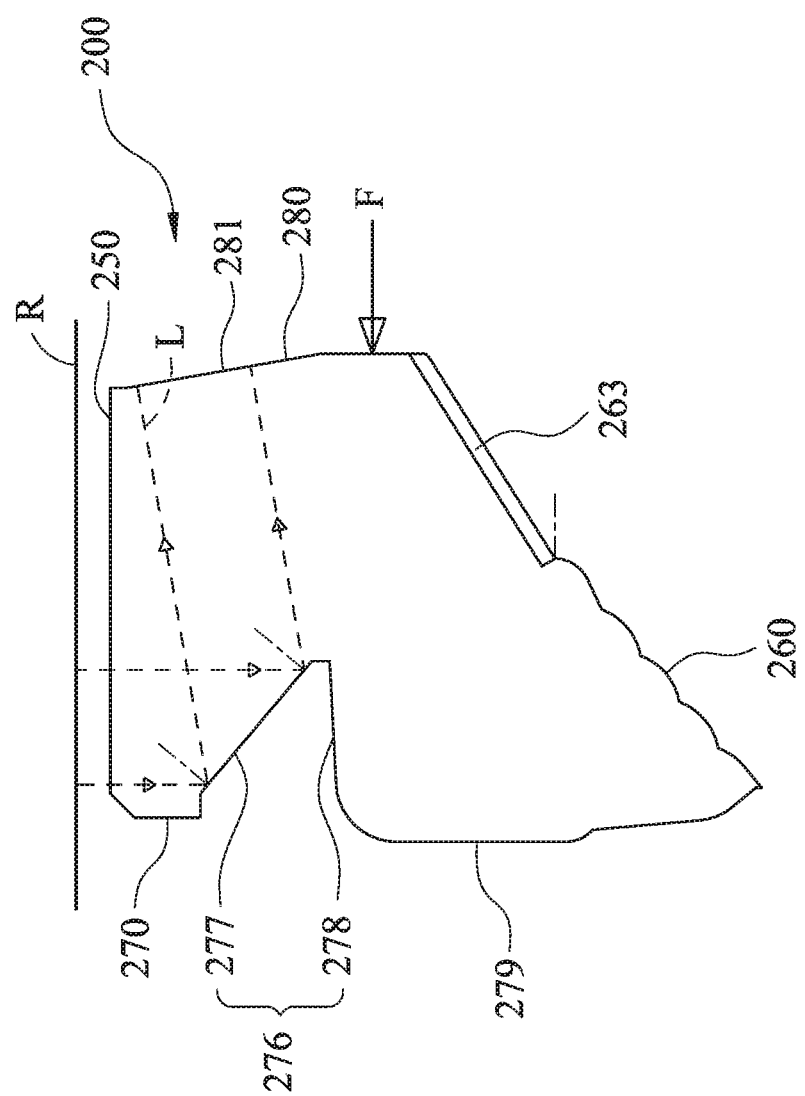
FIG. 2A is a schematic view of an annular optical element according to the 2nd embodiment of the present disclosure and an adjacent surface.

FIG. 2A is a schematic view of an annular optical element 200 according to the 2nd embodiment of the present disclosure and an adjacent surface R. In FIG. 2A, the annular optical element 200 has an optical axis (not shown herein), which is also a central axis of the annular optical element 200. The annular optical element 200 includes an outer diameter surface 250, an inner annular surface 260, an object-side surface 270 and an image-side surface 280. The outer diameter surface 250 surrounds the optical axis. The inner annular surface 260 surrounds the optical axis and forms a central hole (its reference numeral is omitted).

In the 2nd embodiment, the annular optical element 200 has a circularly annular shape with respect to the optical axis. That is, all specific cross-sectional planes of the annular optical element 200 are the same, wherein each of the specific cross-sectional planes passes through the optical axis, a normal direction of each of the specific cross-sectional planes is vertical to the optical axis, and half of each of the specific cross-sectional planes is shown as FIG. 2A.

Figure 2C:
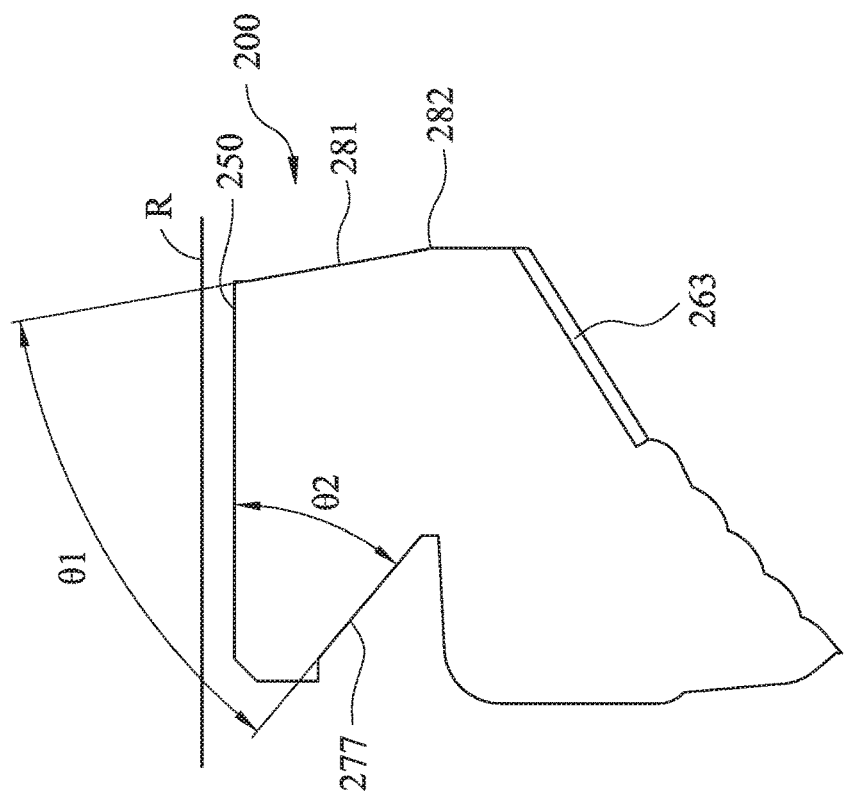
FIG. 2C is another schematic view of the parameters according to FIG. 2A.
Figure 2B:
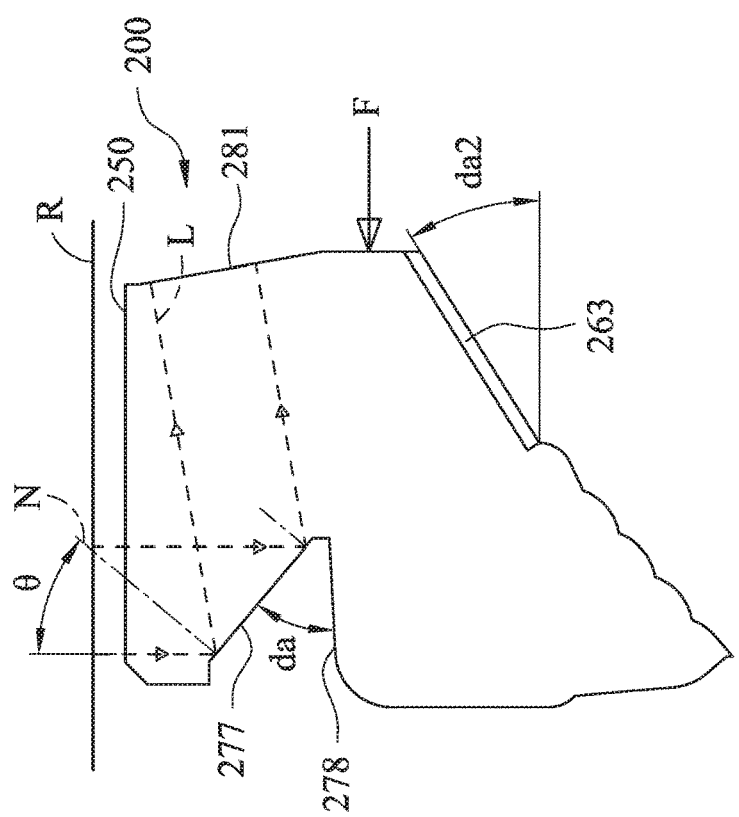
FIG. 2B is a schematic view of the parameters according to FIG. 2A.

FIG. 2B is a schematic view of the parameters according to FIG. 2A, and FIG. 2C is another schematic view of the parameters according to FIG. 2A. In FIG. 2A to FIG. 2C, the object-side surface 270 connects the outer diameter surface 250 and the inner annular surface 260, wherein the object-side surface 270 includes an annular reflecting surface 277, an annular auxiliary surface 278 and a connecting surface 279. The annular reflecting surface 277 is inclined with the optical axis. That is, the annular reflecting surface 277 is a circular conical surface with respect to the optical axis. The annular auxiliary surface 278 is closer to the optical axis than the annular reflecting surface 277 is to the optical axis. The connecting surface 279 is for connecting to an optical element (not shown herein) of the imaging lens module, wherein the connecting surface 279 is closer to the optical axis than the annular auxiliary surface 278 is to the optical axis, That is, the annular reflecting surface 277, the annular auxiliary surface 278 and the connecting surface 279 are formed on the object-side surface 270 in order from the outer diameter surface 250 to the optical axis.

The image-side surface 280 connects the outer diameter surface 250 and the inner annular surface 260, wherein the image-side surface 280 is located opposite to the object-side surface 270 and includes an annular optical surface 281. It can be said that the annular optical surface 281 is formed on the image-side surface 280. A V-shaped groove 276 is formed by the annular auxiliary surface 278 and the annular reflecting surface 277 of the object-side surface 270.

In detail, the annular optical element 200 with the annular reflecting surface 277 and the annular optical surface 281 is formed integrally and made by an injection molding method.

The annular optical element 200 is made of a transparent and colorless plastic material, and transparent to visible light. That is, a transmittance of the annular optical element 200 for visible light is greater than 50%. Therefore, it allows visible light within a wavelength range from 400 nm to 700 nm is used as the inspection light L. Furthermore, it particularly indicates that the annular optical element 200 is transparent to visible light with a wavelength of 587.6 nm, and thereby visible light with a wavelength of 587.6 nm can be used as the inspection light L.

In addition, the annular optical element 200 is also transparent to infrared light. That is, a transmittance of the annular optical element 200 for infrared light is greater than 50%. Accordingly, it allows infrared light within a wavelength range from 700 nm to 1000 nm can be used as the inspection light L, and specifically infrared light with a wavelength of 780 nm can be used.

Specifically, the annular optical element 200 is made of a transparent and colorless plastic material, wherein refractive indices of the annular optical element 200 for lights with different wavelengths are shown as the following Table 2.1. According to Table 2.1, a critical angle $\theta c2$ of the annular optical element 200 for a light with a wavelength of 700 nm and a critical angle $\theta c3$ of the annular optical element 200 for a light with a wavelength of 587.56 nm can be derived from the following Equation (2.1) and Equation (2.2) respectively, wherein parameter Nair represents a refractive index of the air for a light with a corresponding wavelength, parameter N-IR represents a refractive index of the annular optical element 200 for a light with a wavelength of 700 nm, and parameter N-Vis represents a refractive index of the annular optical element 200 for a light with a wavelength of 587.56 nm. It should be understood critical angles of the annular optical element 200 for lights with other wavelengths respectively can be derived according to Equation (2.1) and Equation (2.2) by analogy, and thereby those are omitted in Table 2.1.

TABLE 2.1

Annular optical element 200 of 2nd embodiment

| | Wavelength (nm) | | | | |
|---|---|---|---|---|---|
| | 700 | 656.27 | 587.56 | 486.13 | 400 |
| Refractive index | 1.646 | 1.651 | 1.660 | 1.683 | 1.725 |
| Critical angle (deg.) | 37.41 | | 37.04 | | |

$$\theta c2 = \sin^{-1}\left(\frac{Nair}{N-IR}\right) = \sin^{-1}\left(\frac{1}{1.646}\right) = 37.41° \quad (2.1)$$

$$\theta c3 = \sin^{-1}\left(\frac{Nair}{N-Vis}\right) = \sin^{-1}\left(\frac{1}{1.66}\right) = 37.04° \quad (2.2)$$

The V-shaped groove 276 is tapered from the object-side surface 270 towards the image-side surface 280. Each of the annular optical surface 281, the annular reflecting surface 277 and the outer diameter surface 250 has a specular property. When an angle between the annular reflecting surface 277 and the outer diameter surface 250 is $\theta 2$, and a critical angle of the annular optical element 200 for a light with a wavelength of 780 nm is $\theta c1$, the following condition is satisfied: $\theta 2 > \theta c1$.

The inspection light L is totally reflected from the annular reflecting surface 277, that is, the annular reflecting surface 277 is provided for the inspection light L to be totally reflected therefrom. Furthermore, the inspection light L is able to penetrate the annular optical surface 281, and be reflected from the annular reflecting surface 277 to the outer diameter surface 250. That is, the annular optical surface 281 is provided for the inspection light L to transmit through the annular optical surface 281, and the annular reflecting surface 277 is provided for the inspection light L to be reflected from the annular reflecting surface 277 to the outer diameter surface 250.

Specifically, for example, in FIG. 2A and FIG. 2B, the adjacent surface R is disposed adjacent to or connected to the outer diameter surface 250. When the inspection light L with a wavelength is able to penetrate and enter into the annular optical element 200, the inspection light L is incident on the annular optical surface 281, the annular reflecting surface 277, the outer diameter surface 250 and the adjacent surface R in order. The path of the inspection light L, as an example, described in this paragraph is not shown in drawings, but may be along a reverse arrow direction in FIG. 2A and FIG. 2B. Moreover, the annular optical surface 281 is inclined with the optical axis of the annular optical element 200 (i.e. not vertical to the optical axis). The inspection light L is incident on each of the annular optical surface 281, the outer diameter surface 250 and the adjacent surface R with an incident angle equal to or approaching zero degrees. The inspection light L is incident on the annular reflecting surface 277 with an incident angle θ, which is greater than a critical angle thereof.

Next, the inspection light L reflected from the adjacent surface R is incident on the outer diameter surface 250, the annular reflecting surface 277 and the annular optical surface 281 in order. The path of the inspection light L, as an example, described in this paragraph may be shown as an arrow direction in FIG. 2A and FIG. 2B. Moreover, the inspection light L is incident on each of the outer diameter surface 250 and the annular optical surface 281 with an incident angle equal to or approaching zero degrees. The inspection light L is incident on the annular reflecting surface 277 with an incident angle θ, which is greater than a critical angle thereof. Therefore, it is favorable for observing the inspection image on the annular optical surface 281 visually or by the image inspection equipment, wherein the differences of the inspection image are distinguishable and corresponding to different structural properties of the adjacent surface R and the outer diameter surface 250. Furthermore, it should be understood that the path of the inspection light L according to the aforementioned descriptions, FIG. 2A and FIG. 2B is just an example among various possible paths, while an inspection light is applied to the annular optical element 200.

In FIG. 2A to FIG. 2C, the inner annular surface 260 includes an adjusting structure 263 extended towards the image-side surface 280, and the adjusting structure 263 is closer to the optical axis than the annular optical surface 281 is to the optical axis. Furthermore, the adjusting structure 263 is located on the inner annular surface 260 and the image-side surface 280 simultaneously, and a surface facing the optical axis of the adjusting structure 263 is a circular conical surface with respect to the optical axis. The adjusting structure 263 has a light diminishing surface, wherein a size range of a surface roughness (Ra) of the adjusting structure 263 is 0.4 μm to 0.56 μm.

In FIG. 2B and FIG. 2C, a vertical parting molding structure 282 is located between the annular optical surface 281 and the adjusting structure 263. Furthermore, there is a surface (its reference numeral is omitted), which withstands a pressing force F during assembling the imaging lens module, vertical to the optical axis between the annular optical surface 281 (not vertical to the optical axis) and the adjusting structure 263. The vertical parting molding structure 282 is located on the boundary between the annular optical surface 281 and the said surface vertical to the optical axis.

The data of the parameters of the annular optical element 200 according to the 2nd embodiment of the present disclosure are listed in the following Table 2.2, wherein the parameters are also shown as FIG. 2B and FIG. 2C. The definitions of these parameters shown in Table 2.2 are the same as those stated in the 1st embodiment with corresponding values in the 2nd embodiment.

TABLE 2.2

| 2nd embodiment | | | |
|---|---|---|---|
| da (deg.) | 43 | θc3 (deg.) | 37.04 |
| da2 (deg.) | 32 | nd | 1.660 |
| θ (deg.) | 40 | Vd | 20.4 |
| θ1 (deg.) | 40 | Ra1 | 0.012a |
| θ2 (deg.) | 40 | Ra2 | 0.012a |
| θc2 (deg.) | 37.41 | Ra3 | 0.005a~0.05a |

3rd Embodiment

Figure 3A:
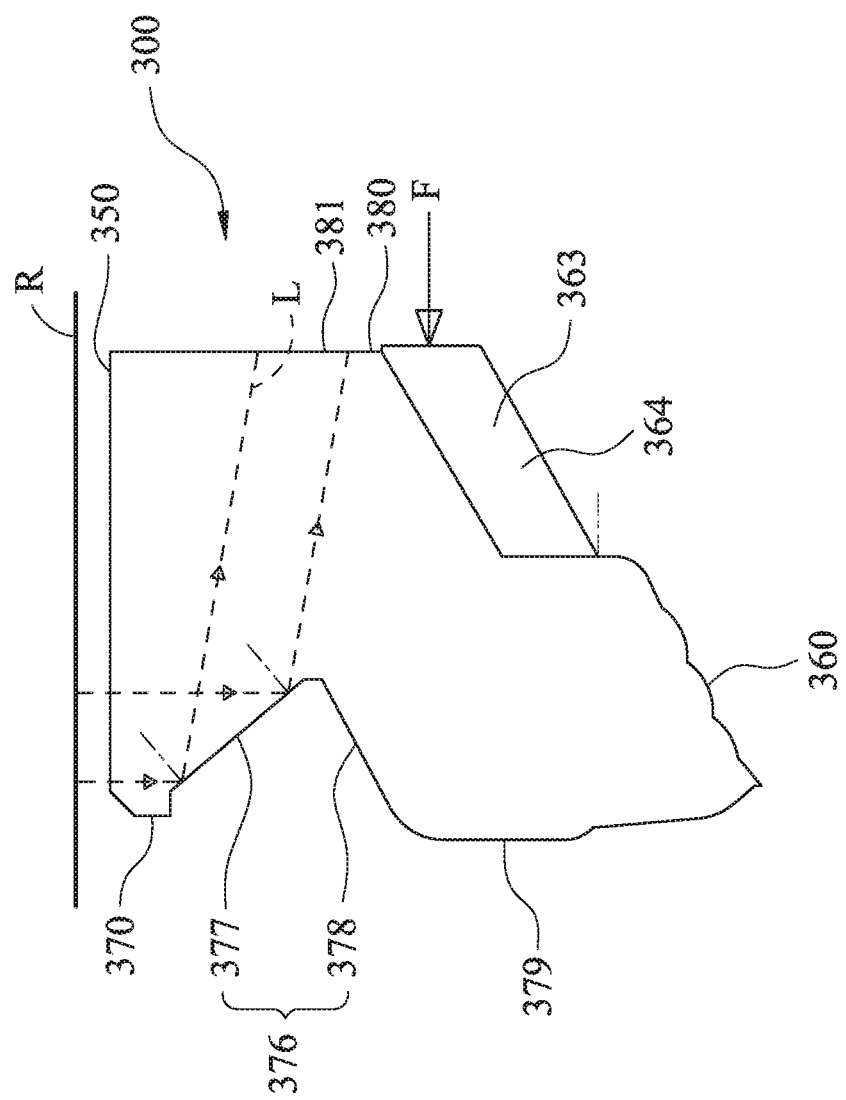
FIG. 3A is a schematic view of an annular optical element according to the 3rd embodiment of the present disclosure and an adjacent surface.

FIG. 3A is a schematic view of an annular optical element 300 according to the 3rd embodiment of the present disclosure and an adjacent surface R. In FIG. 3A, the annular optical element 300 has an optical axis (not shown herein), which is also a central axis of the annular optical element 300. The annular optical element 300 includes an outer diameter surface 350, an inner annular surface 360, an object-side surface 370 and an image-side surface 380. The outer diameter surface 350 surrounds the optical axis. The inner annular surface 360 surrounds the optical axis and forms a central hole (its reference numeral is omitted).

In the 3rd embodiment, the annular optical element 300 has a circularly annular shape with respect to the optical axis. That is, all specific cross-sectional planes of the annular optical element 300 are the same, wherein each of the specific cross-sectional planes passes through the optical axis, a normal direction of each of the specific cross-sectional planes is vertical to the optical axis, and half of each of the specific cross-sectional planes is shown as FIG. 3A.

Figure 3C:
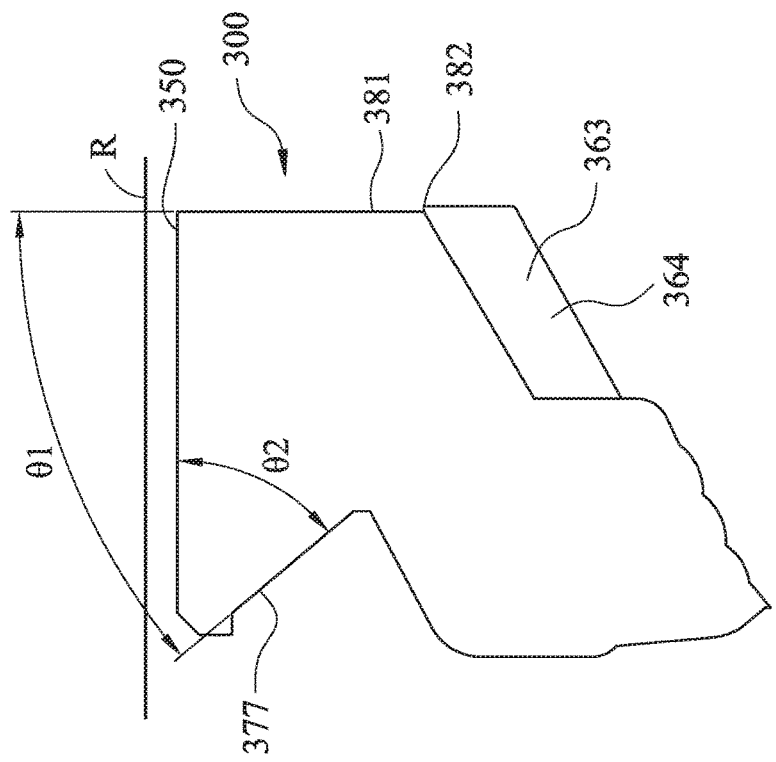
FIG. 3C is another schematic view of the parameters according to FIG. 3A.
Figure 3B:
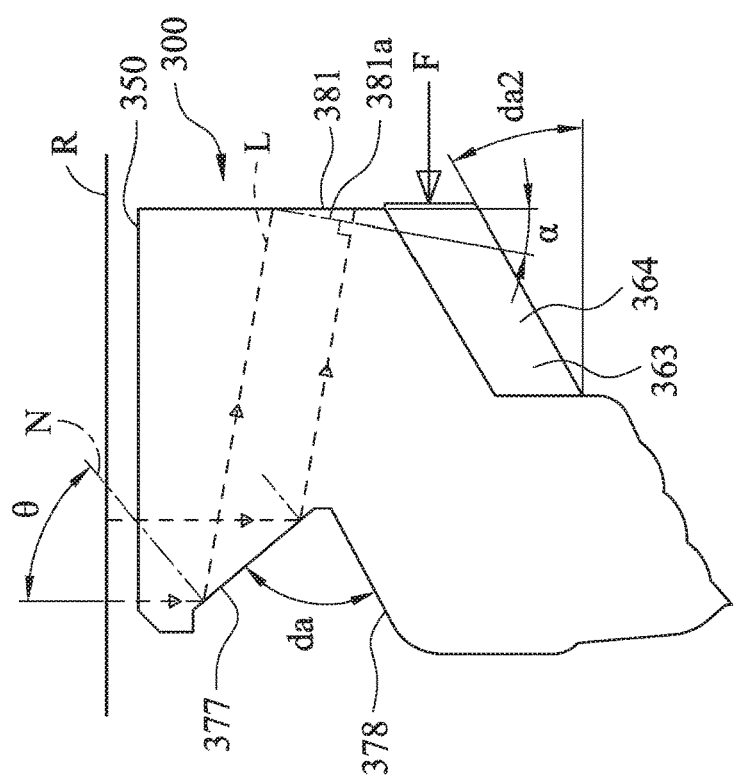
FIG. 3B is a schematic view of the parameters according to FIG. 3A.

FIG. 3B is a schematic view of the parameters according to FIG. 3A, and FIG. 3C is another schematic view of the parameters according to FIG. 3A. In FIG. 3A to FIG. 3C, the object-side surface 370 connects the outer diameter surface 350 and the inner annular surface 360, wherein the object-side surface 370 includes an annular reflecting surface 377, an annular auxiliary surface 378 and a connecting surface 379. The annular reflecting surface 377 is inclined with the optical axis. That is, the annular reflecting surface 377 is a circular conical surface with respect to the optical axis. The annular auxiliary surface 378 is closer to the optical axis than the annular reflecting surface 377 is to the optical axis. The connecting surface 379 is for connecting to an optical element (not shown herein) of the imaging lens module, wherein the connecting surface 379 is closer to the optical axis than the annular auxiliary surface 378 is to the optical axis. That is, the annular reflecting surface 377, the annular auxiliary surface 378 and the connecting surface 379 are formed on the object-side surface 370 in order from the outer diameter surface 350 to the optical axis.

The image-side surface 380 connects the outer diameter surface 350 and the inner annular surface 360, wherein the image-side surface 380 is located opposite to the object-side surface 370 and includes an annular optical surface 381. It can be said that the annular optical surface 381 is formed on the image-side surface 380. A V-shaped groove 376 is formed by the annular auxiliary surface 378 and the annular reflecting surface 377 of the object-side surface 370.

In detail, the annular optical element 300 with the annular reflecting surface 377 and the annular optical surface 381 is formed integrally and made by an injection molding method.

The annular optical element 300 is made of a black plastic material, and transparent to infrared light. That is, a transmittance of the annular optical element 300 for infrared light is greater than 50%. Accordingly, it allows infrared light within a wavelength range from 700 nm to 1000 nm can be used as the inspection light L. Therefore, the annular optical element 300 in the black plastic material is favorable for reducing the stray light so as not to affect the image quality of the imaging lens module. In addition, infrared light being used as the inspection light L is advantageous in avoiding a conflict with visible light and thereby simultaneously inspecting the image quality and assembling quality of the imaging lens module. Furthermore, it particularly indicates that the annular optical element 300 is transparent to infrared light with a wavelength of 780 nm, and thereby infrared light with a wavelength of 780 nm can be used as the inspection light L.

Specifically, the annular optical element 300 is made of a black plastic material, wherein refractive indices of the annular optical element 300 for lights with different wavelengths are shown as the following Table 3.1. According to Table 3.1, a critical angle $\theta c2$ of the annular optical element 300 for a light with a wavelength of 700 nm and a critical angle $\theta c3$ of the annular optical element 300 for a light with a wavelength of 587.56 nm can be derived from the following Equation (3.1) and Equation (3.2) respectively, wherein parameter Nair represents a refractive index of the air for a light with a corresponding wavelength, parameter N-IR represents a refractive index of the annular optical element 300 for a light with a wavelength of 700 nm, and parameter N-Vis represents a refractive index of the annular optical element 300 for a light with a wavelength of 587.56 nm. It should be understood critical angles of the annular optical element 300 for lights with other wavelengths respectively can be derived according to Equation (3.1) and Equation (3.2) by analogy, and thereby those are omitted in Table 3.1,

TABLE 3.1

Annular optical element 300 of 3rd embodiment

| | Wavelength (nm) | | | | |
|---|---|---|---|---|---|
| | 700 | 656.27 | 587.56 | 486.13 | 400 |
| Refractive index | 1.627 | 1.631 | 1.639 | 1.658 | 1.692 |
| Critical angle (deg.) | 37.92 | | 37.6 | | |

$$\theta c2 = \sin^{-1}\left(\frac{Nair}{N - IR}\right) = \sin^{-1}\left(\frac{1}{1.627}\right) = 37.92° \quad (3.1)$$

$$\theta c3 = \sin^{-1}\left(\frac{Nair}{N - Vis}\right) = \sin^{-1}\left(\frac{1}{1.639}\right) = 37.6° \quad (3.2)$$

The V-shaped groove 376 is tapered from the object-side surface 370 towards the image-side surface 380. Each of the annular optical surface 381, the annular reflecting surface 377 and the outer diameter surface 350 has a specular property. When an angle between the annular reflecting surface 377 and the outer diameter surface 350 is $\theta 2$, and a critical angle of the annular optical element 300 for a light with a wavelength of 780 nm is $\theta c1$, the following condition is satisfied: $\theta 2 > \theta c1$.

The inspection light L is totally reflected from the annular reflecting surface 377, that is, the annular reflecting surface 377 is provided for the inspection light L to be totally reflected therefrom. Furthermore, the inspection light L is able to penetrate the annular optical surface 381, and be reflected from the annular reflecting surface 377 to the outer diameter surface 350, That is, the annular optical surface 381 is provided for the inspection light L to transmit through the annular optical surface 381, and the annular reflecting surface 377 is provided for the inspection light L to be reflected from the annular reflecting surface 377 to the outer diameter surface 350.

Specifically, for example, in FIG. 3A and FIG. 3B, the adjacent surface R is disposed adjacent to or connected to the outer diameter surface 350. When the inspection light L with a wavelength is able to penetrate and enter into the annular optical element 300, the inspection light L is incident on the annular optical surface 381, the annular reflecting surface 377, the outer diameter surface 350 and the adjacent surface R in order. The path of the inspection light L, as an example, described in this paragraph is not shown in drawings, but may be along a reverse arrow direction in FIG. 3A and FIG. 3B. Moreover, the annular optical surface 381 is vertical to the optical axis of the annular optical element 300. The inspection light L is incident on the annular optical surface 381 with an incident angle not equal to zero degrees. The inspection light L is incident on the annular reflecting surface 377 with an incident angle $\theta$, which is greater than a critical angle thereof. The inspection light L is incident on each of the outer diameter surface 350 and the adjacent surface R with an incident angle equal to or approaching zero degrees.

Next, the inspection light L reflected from the adjacent surface R is incident on the outer diameter surface 350, the annular reflecting surface 377 and the annular optical surface 381 in order. The path of the inspection light L, as an example, described in this paragraph may be shown as an arrow direction in FIG. 3A and FIG. 3B. Moreover, the inspection light L is incident on the outer diameter surface 350 with an incident angle equal to or approaching zero degrees. The inspection light L is incident on the annular reflecting surface 377 with an incident angle $\theta$, which is greater than a critical angle thereof. The inspection light L is incident on the annular optical surface 381 with an incident angle not equal to zero degrees. Therefore, it is favorable for observing the inspection image on the annular optical surface 381 visually or by the image inspection equipment, wherein the differences of the inspection image are distinguishable and corresponding to different structural properties of the adjacent surface R and the outer diameter surface 350. Furthermore, it should be understood that the path of the inspection light L according to the aforementioned descriptions, FIG. 3A and FIG. 3B is just an example among various possible paths, while an inspection light is applied to the annular optical element 300.

In FIG. 3B, the annular optical surface 381 is vertical to the optical axis of the annular optical element 300, and the inspection light L is incident on the annular optical surface 381 with the incident angle not equal to zero degrees as an example in FIG. 3B. When an inspection image is observed from the annular optical surface 381, the inspection image would be located far from the outer diameter surface 350 (i.e. towards the optical axis). Thus, the inspection image observed visually is like being not located on the annular optical surface 381. On the contrary, the inspection image observed visually from the annular optical surface 181 according to the 1st embodiment is like being located on the annular optical surface 181.

Furthermore, if the annular optical surface 381 is replaced by a virtual substitute surface 381a in FIG. 3B at the design and manufacturing stages of the annular optical element 300 (i.e. the annular optical surface 381 being changed to the virtual substitute surface 381a), the inspection image observed visually from the virtual substitute surface 381a would be like being located on the virtual substitute surface 381a. Specifically, an angle between the annular optical surface 381 and the virtual substitute surface 381a is a, the virtual substitute surface 381a is not vertical to the optical axis of the annular optical element 300, and the inspection light L is incident on the virtual substitute surface 381a with the incident angle equal to or approaching zero degrees as an example in FIG. 3B.

In FIG. 3A and FIG. 3C, the inner annular surface 360 includes an adjusting structure 363 extended towards the image-side surface 380, and the adjusting structure 363 is closer to the optical axis than the annular optical surface 381 is to the optical axis. The adjusting structure 363 includes a plurality of strip-shaped structures 364, and it could be said that the adjusting structure 363 is formed with the strip-shaped structures 364. The strip-shaped structures 364 are extended from the object-side surface 370 towards the image-side surface 380, and the adjusting structure 363 with the strip-shaped structures 364 is located on the inner annular surface 360 and the image-side surface 380 simultaneously. The strip-shaped structures 364 are adjacent to and slightly protruded more than the annular optical surface 381. Furthermore, each of the strip-shaped structures 364 has a wedge shape and a specular property.

A vertical parting molding structure 382 is located between the annular optical surface 381 and the adjusting structure 363. Specifically, the vertical parting molding structure 382 is located on the boundary between the annular optical surface 381 and the adjusting structure 363, and is an annular stepped structure formed by the protruding differences between the strip-shaped structures 364 and the annular optical surface 381 (the strip-shaped structures 364 being protruded more than the annular optical surface 381).

The data of the parameters of the annular optical element 300 according to the 3rd embodiment of the present disclosure are listed in the following Table 3.2, wherein the parameters are also shown as FIG. 3B and FIG. 3C. The definitions of these parameters shown in Table 3.2 are the same as those stated in the 1st embodiment with corresponding values in the 3rd embodiment.

TABLE 3.2

| 3rd embodiment | | | |
|---|---|---|---|
| da (deg.) | 78 | Vd | 23.3 |
| da2 (deg.) | 29.18 | Ra1 | 0.012a |
| θ (deg.) | 50 | Ra2 | 0.012a |
| θ1 (deg.) | 40 | Ra3 | 0.005a~0.05a |
| θ2 (deg.) | 50 | Ra4 | 0.005a~0.05a |
| θc2 (deg.) | 37.92 | N1 | 240 |
| θc3 (deg.) | 37.6 | α (deg.) | 10 |
| nd | 1.639 | | |

4th Embodiment

Figure 4A:
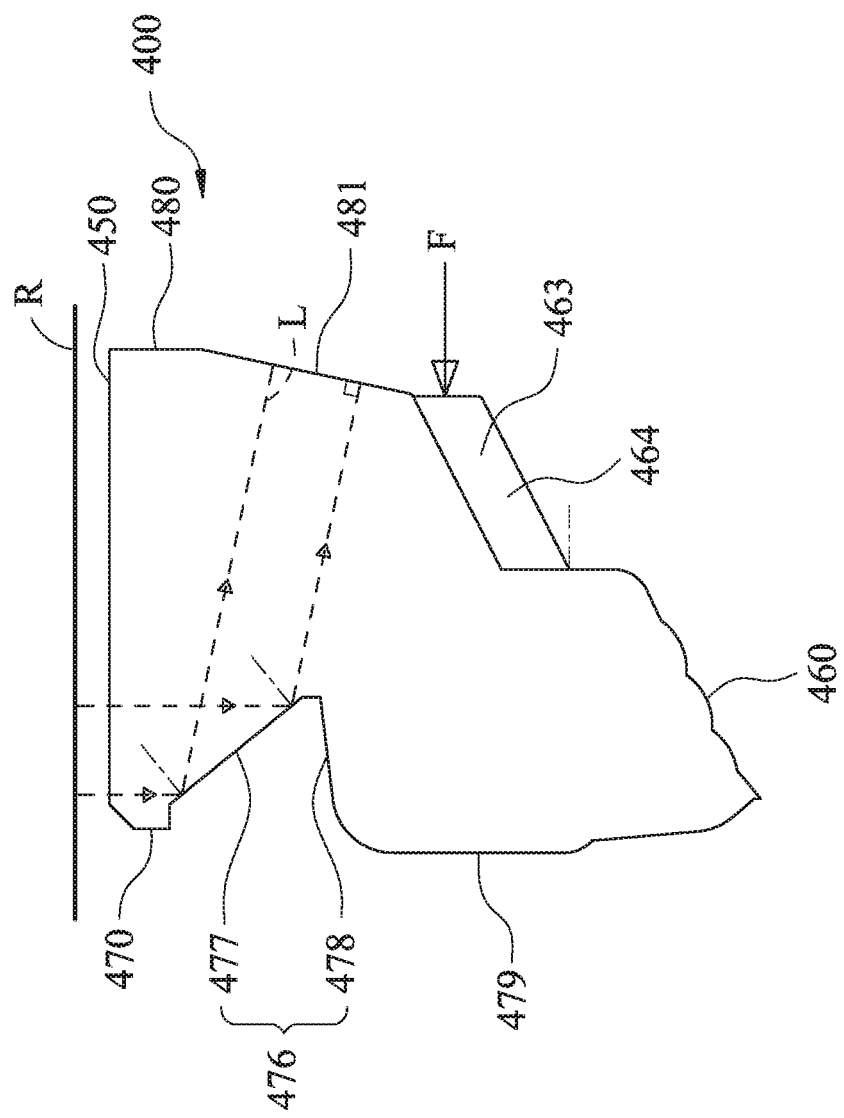
FIG. 4A is a schematic view of an annular optical element according to the 4th embodiment of the present disclosure and an adjacent surface.

FIG. 4A is a schematic view of an annular optical element 400 according to the 4th embodiment of the present disclosure and an adjacent surface R. In FIG. 4A, the annular optical element 400 has an optical axis (not shown herein), which is also a central axis of the annular optical element 400. The annular optical element 400 includes an outer diameter surface 450, an inner annular surface 460, an object-side surface 470 and an image-side surface 480. The outer diameter surface 450 surrounds the optical axis. The inner annular surface 460 surrounds the optical axis and forms a central hole (its reference numeral is omitted).

In the 4th embodiment, the annular optical element 400 has a circularly annular shape with respect to the optical axis. That is, all specific cross-sectional planes of the annular optical element 400 are the same, wherein each of the specific cross-sectional planes passes through the optical axis, a normal direction of each of the specific cross-sectional planes is vertical to the optical axis, and half of each of the specific cross-sectional planes is shown as FIG. 4A.

Figure 4C:
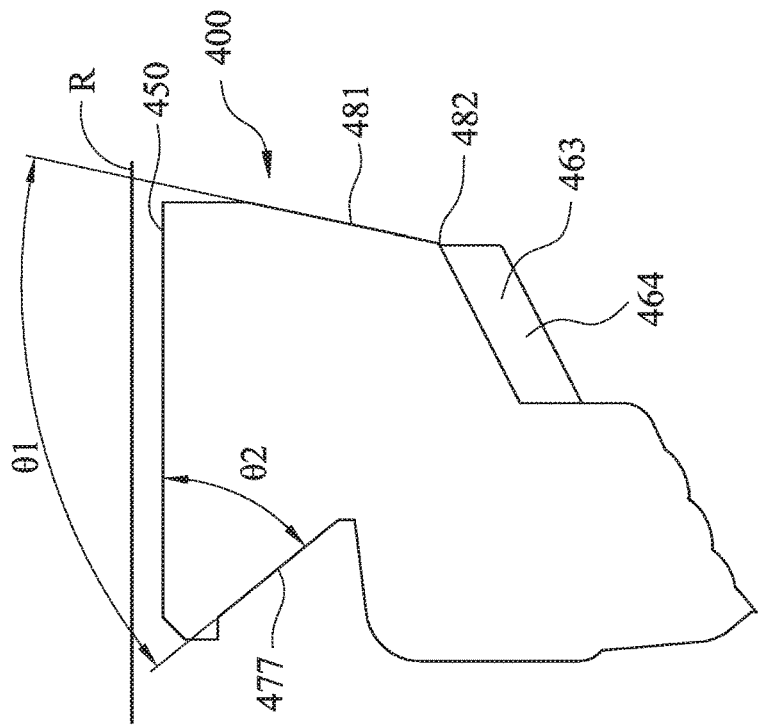
FIG. 4C is another schematic view of the parameters according to FIG. 4A.
Figure 4B:
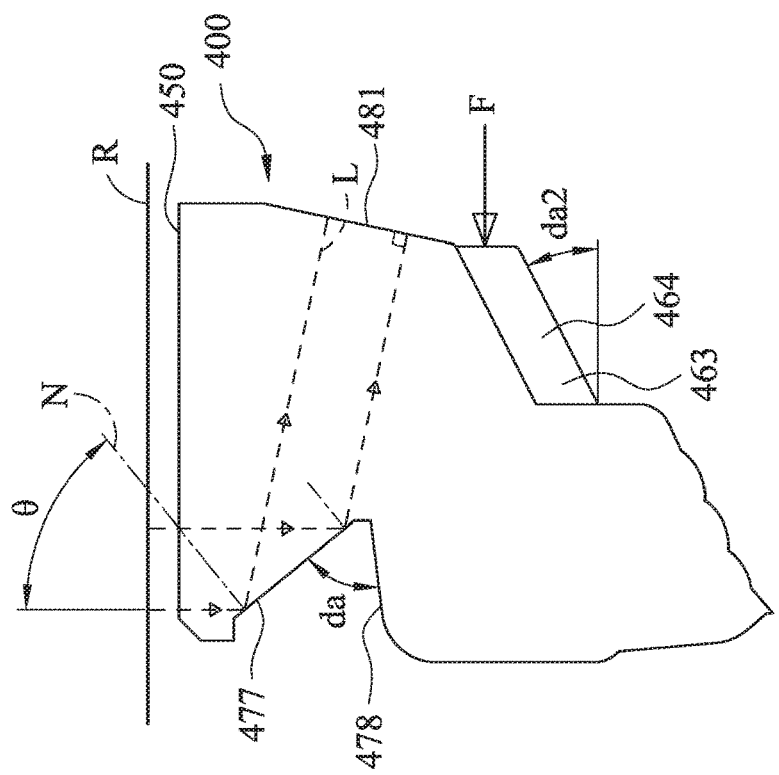
FIG. 4B is a schematic view of the parameters according to FIG. 4A.

FIG. 4B is a schematic view of the parameters according to FIG. 4A, and FIG. 4C is another schematic view of the parameters according to FIG. 4A. In FIG. 4A to FIG. 4C, the object-side surface 470 connects the outer diameter surface 450 and the inner annular surface 460, wherein the object-side surface 470 includes an annular reflecting surface 477, an annular auxiliary surface 478 and a connecting surface 479. The annular reflecting surface 477 is inclined with the optical axis. That is, the annular reflecting surface 477 is a circular conical surface with respect to the optical axis. The annular auxiliary surface 478 is closer to the optical axis than the annular reflecting surface 477 is to the optical axis. The connecting surface 479 is for connecting to an optical element (not shown herein) of the imaging lens module, wherein the connecting surface 479 is closer to the optical axis than the annular auxiliary surface 478 is to the optical axis, That is, the annular reflecting surface 477, the annular auxiliary surface 478 and the connecting surface 479 are formed on the object-side surface 470 in order from the outer diameter surface 450 to the optical axis.

The image-side surface 480 connects the outer diameter surface 450 and the inner annular surface 460, wherein the image-side surface 480 is located opposite to the object-side surface 470 and includes an annular optical surface 481. It can be said that the annular optical surface 481 is formed on the image-side surface 480. A V-shaped groove 476 is formed by the annular auxiliary surface 478 and the annular reflecting surface 477 of the object-side surface 470.

In detail, the annular optical element 400 with the annular reflecting surface 477 and the annular optical surface 481 is formed integrally and made by an injection molding method.

The annular optical element 400 is made of a black plastic material, and transparent to infrared light. That is, a transmittance of the annular optical element 400 for infrared light is greater than 50%. Accordingly, it allows infrared light within a wavelength range from 700 nm to 1000 nm can be used as the inspection light L. Furthermore, it particularly indicates that the annular optical element 400 is transparent to infrared light with a wavelength of 780 nm, and thereby infrared light with a wavelength of 780 nm can be used as the inspection light L.

Specifically, the annular optical element 400 is made of a black plastic material, wherein refractive indices of the annular optical element 400 for lights with different wavelengths are shown as the following Table 4.1. According to Table 4.1, a critical angle θc2 of the annular optical element 400 for a light with a wavelength of 700 nm and a critical angle θc3 of the annular optical element 400 for a light with a wavelength of 587.56 nm can be derived from the following Equation (4.1) and Equation (4.2) respectively, wherein parameter Nair represents a refractive index of the air for a light with a corresponding wavelength, parameter N-IR represents a refractive index of the annular optical element 400 for a light with a wavelength of 700 nm, and parameter N-Vis represents a refractive index of the annular optical element 400 for a light with a wavelength of 587.56 nm. It should be understood critical angles of the annular optical element 400 for lights with other wavelengths respectively can be derived according to Equation (4.1) and Equation (4.2) by analogy, and thereby those are omitted in Table 4.1.

TABLE 4.1

Annular optical element 400 of 4th embodiment

| | Wavelength (nm) | | | | |
|---|---|---|---|---|---|
| | 700 | 656.27 | 587.56 | 486.13 | 400 |
| Refractive index | 1.574 | 1.577 | 1.582 | 1.596 | 1.618 |
| Critical angle (deg.) | 39.45 | | 39.19 | | |

$$\theta c2 = \sin^{-1}\left(\frac{Nair}{N-IR}\right) = \sin^{-1}\left(\frac{1}{1.574}\right) = 39.45° \quad (4.1)$$

$$\theta c3 = \sin^{-1}\left(\frac{Nair}{N-Vis}\right) = \sin^{-1}\left(\frac{1}{1.582}\right) = 39.19° \quad (4.2)$$

The V-shaped groove 476 is tapered from the object-side surface 470 towards the image-side surface 480. Each of the annular optical surface 481, the annular reflecting surface 477 and the outer diameter surface 450 has a specular property. When an angle between the annular reflecting surface 477 and the outer diameter surface 450 is θ2, and a critical angle of the annular optical element 400 for a light with a wavelength of 780 nm is θc1, the following condition is satisfied: θ2>θc1.

The inspection light L is totally reflected from the annular reflecting surface 477, that is, the annular reflecting surface 477 is provided for the inspection light L to be totally reflected therefrom. Furthermore, the inspection light L is able to penetrate the annular optical surface 481, and be reflected from the annular reflecting surface 477 to the outer diameter surface 450. That is, the annular optical surface 481 is provided for the inspection light L to transmit through the annular optical surface 481, and the annular reflecting surface 477 is provided for the inspection light L to be reflected from the annular reflecting surface 477 to the outer diameter surface 450.

Specifically, for example, in FIG. 4A and FIG. 4B, the adjacent surface R is disposed adjacent to or connected to the outer diameter surface 450. When the inspection light L with a wavelength is able to penetrate and enter into the annular optical element 400, the inspection light L is incident on the annular optical surface 481, the annular reflecting surface 477, the outer diameter surface 450 and the adjacent surface R in order. The path of the inspection light L, as an example, described in this paragraph is not shown in drawings, but may be along a reverse arrow direction in FIG. 4A and FIG. 4B. Moreover, the annular optical surface 481 is inclined with the optical axis of the annular optical element 400 (i.e. not vertical to the optical axis). The inspection light L is incident on each of the annular optical surface 481, the outer diameter surface 450 and the adjacent surface R with an incident angle equal to or approaching zero degrees. The inspection light L is incident on the annular reflecting surface 477 with an incident angle A, which is greater than a critical angle thereof.

Next, the inspection light L reflected from the adjacent surface R is incident on the outer diameter surface 450, the annular reflecting surface 477 and the annular optical surface 481 in order. The path of the inspection light L, as an example, described in this paragraph may be shown as an arrow direction in FIG. 4A and FIG. 4B. Moreover, the inspection light L is incident on each of the outer diameter surface 450 and the annular optical surface 481 with an incident angle equal to or approaching zero degrees. The inspection light L is incident on the annular reflecting surface 477 with an incident angle θ, which is greater than a critical angle thereof. Therefore, it is favorable for observing the inspection image on the annular optical surface 481 visually or by the image inspection equipment, wherein the differences of the inspection image are distinguishable and corresponding to different structural properties of the adjacent surface R and the outer diameter surface 450. Furthermore, it should be understood that the path of the inspection light L according to the aforementioned descriptions, FIG. 4A and FIG. 4B is just an example among various possible paths, while an inspection light is applied to the annular optical element 400.

In FIG. 4A and FIG. 4C, the inner annular surface 460 includes an adjusting structure 463 extended towards the image-side surface 480, and the adjusting structure 463 is closer to the optical axis than the annular optical surface 481 is to the optical axis. The adjusting structure 463 includes a plurality of strip-shaped structures 464, and it could be said that the adjusting structure 463 is formed with the strip-shaped structures 464. The strip-shaped structures 464 are extended from the object-side surface 470 towards the image-side surface 480, and the adjusting structure 463 with the strip-shaped structures 464 is located on the inner annular surface 460 and the image-side surface 480 simultaneously. The strip-shaped structures 464 are adjacent to and slightly protruded more than the annular optical surface 481. Furthermore, each of the strip-shaped structures 464 has a wedge shape and a specular property.

A vertical parting molding structure 482 is located between the annular optical surface 481 and the adjusting structure 463, Specifically, the vertical parting molding structure 482 is located on the boundary between the annular optical surface 481 and the adjusting structure 463, and is an annular stepped structure formed by the protruding differences between the strip-shaped structures 464 and the annular optical surface 481 (the annular optical surface 481 being protruded more than the strip-shaped structures 464).

The data of the parameters of the annular optical element 400 according to the 4th embodiment of the present disclosure are listed in the following Table 4.2, wherein the parameters are also shown as FIG. 4B and FIG. 4O. The definitions of these parameters shown in Table 4.2 are the same as those stated in the 1st embodiment with corresponding values in the 4th embodiment.

TABLE 4.2

| 4th embodiment | | | |
|---|---|---|---|
| da (deg.) | 58 | nd | 1.582 |
| da2 (deg.) | 27 | Vd | 30.2 |
| θ (deg.) | 51 | Ra1 | 0.025a |
| θ1 (deg.) | 51 | Ra2 | 0.025a |
| θ2 (deg.) | 51 | Ra3 | 0.005a~0.05a |
| θc2 (deg.) | 39.45 | Ra4 | 0.005a~0.05a |
| θc3 (deg.) | 39.19 | N1 | 240 |

5th Embodiment

Figure 5A:
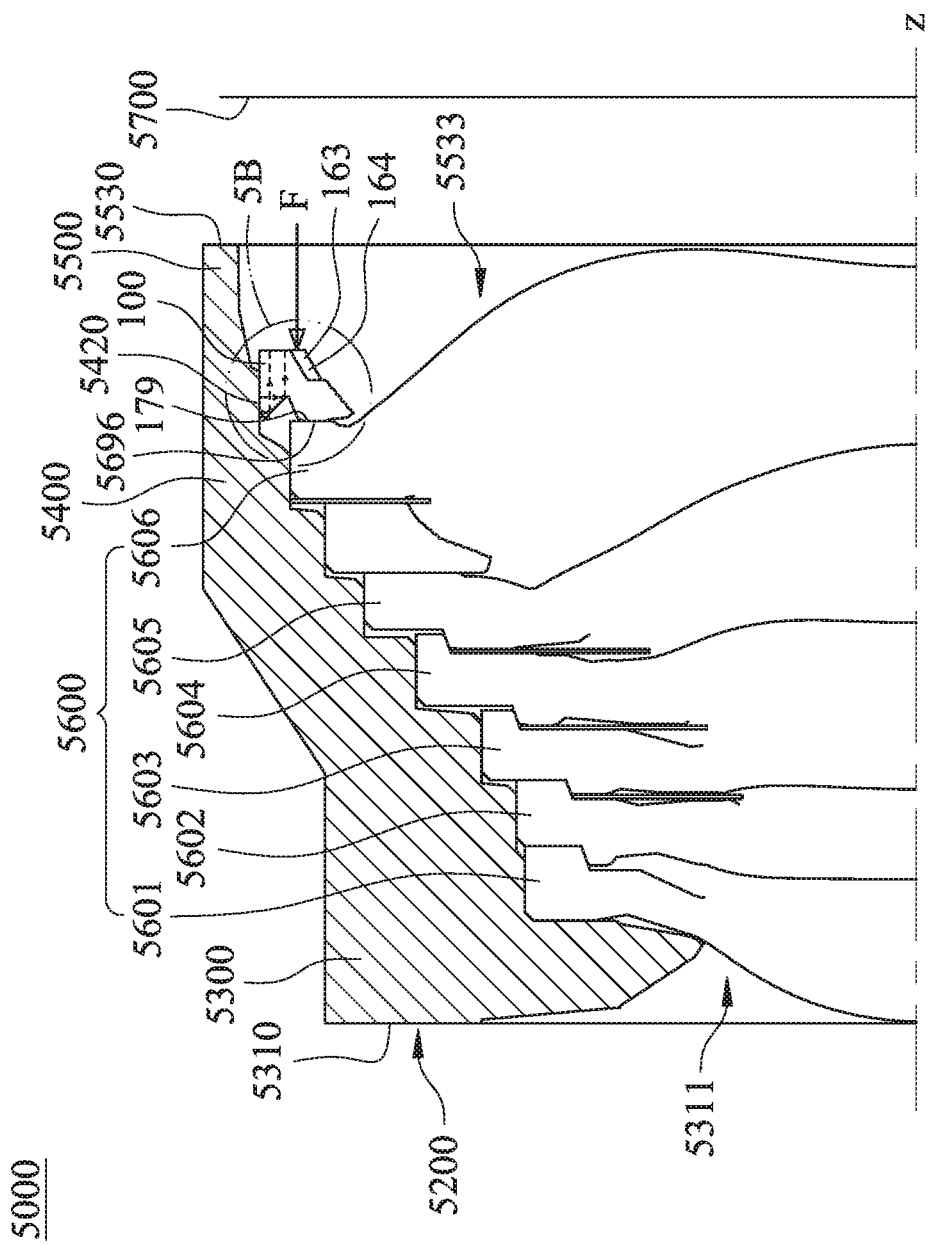
FIG. 5A is a schematic view of an imaging lens module according to the 5th embodiment of the present disclosure.

FIG. 5A is a schematic view of an imaging lens module 5000 according to the 5th embodiment of the present disclosure, wherein some details about optical elements are omitted in FIG. 5A. Furthermore, in order to more clearly show the imaging lens module 5000 according to the 5th embodiment, the other half, which is symmetrical with the half shown in FIG. 5A relative to the optical axis z, is omitted in FIG. 5A. In FIG. 5A, the imaging lens module 5000 includes the annular optical element 100 of the 1st embodiment according to the present disclosure, an optical lens assembly 5600 and a plastic barrel 5200. The other details of the annular optical element 100 have been described in the foregoing paragraphs of the 1st embodiment and will not be described again herein.

Figure 5B:
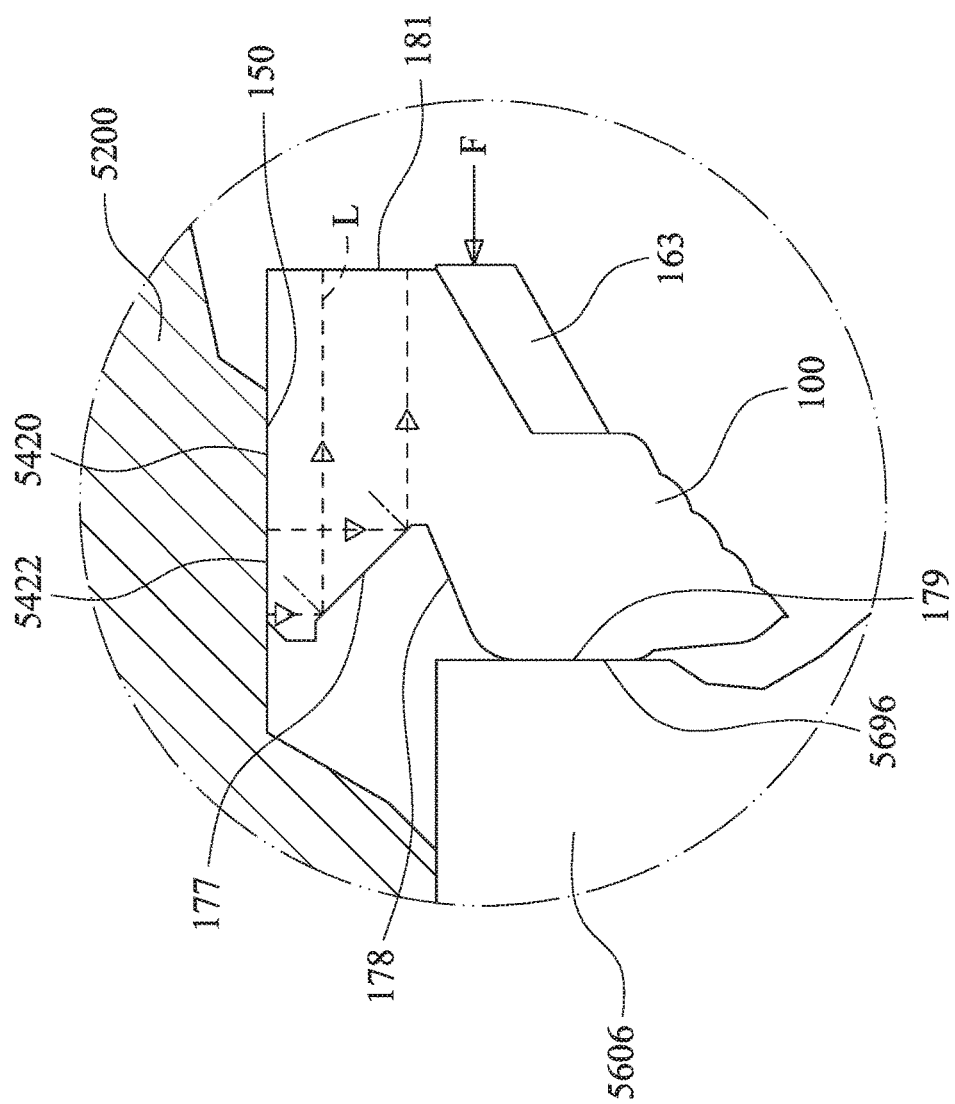
FIG. 5B is an enlarged view of part 5B in FIG. 5A.
Figure 5C:
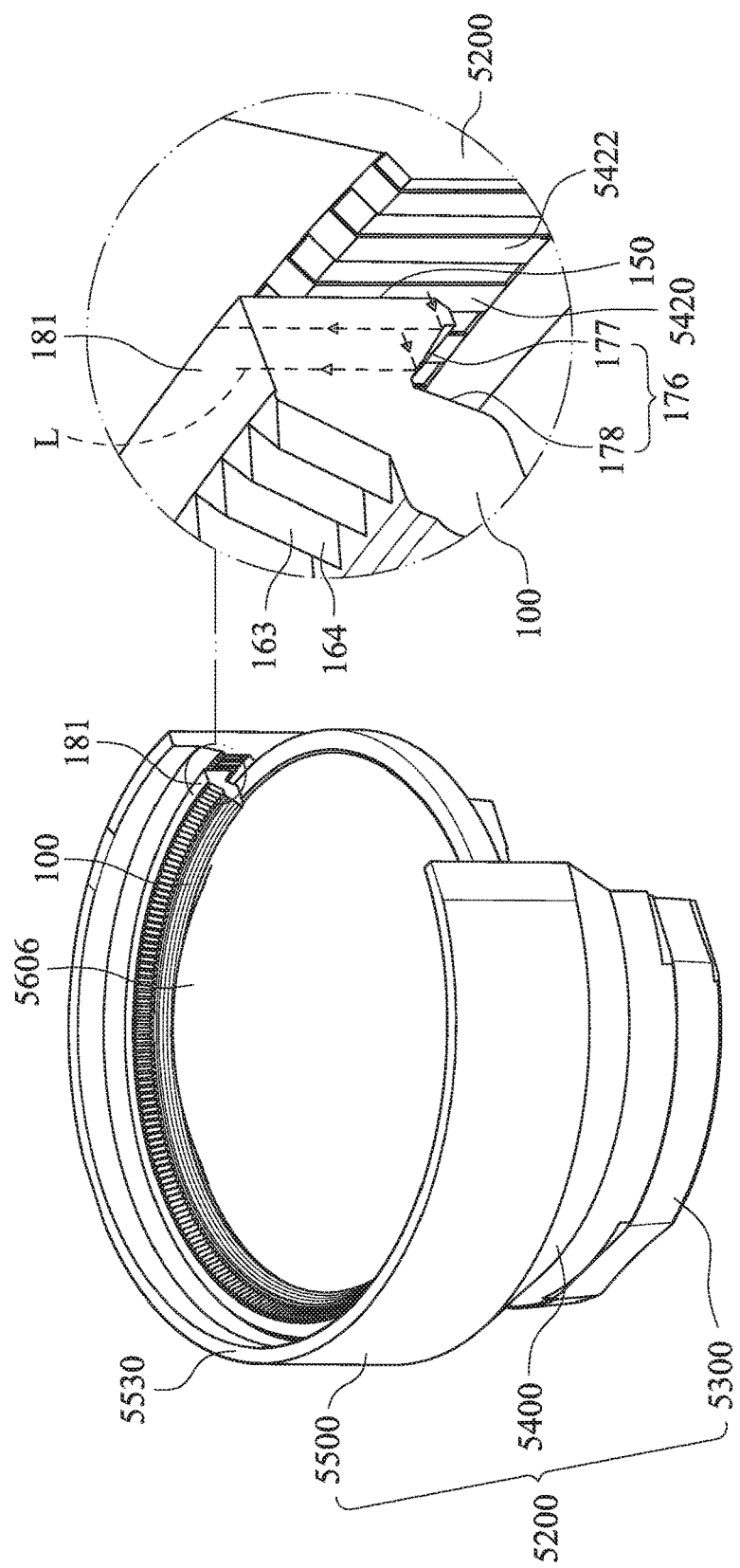
FIG. 5C is a partial three-dimensional view of the imaging lens module according to the 5th embodiment.

FIG. 5B is an enlarged view of part 5B in FIG. 5A, and FIG. 5C is a partial three-dimensional view of the imaging lens module 5000 according to the 5th embodiment. In FIG. 5A to FIG. 5C, the optical lens assembly 5600 includes a plurality of lens elements 5601, 5602, 5603, 5604, 5605 and 5606. The lens elements 5601, 5602, 5603, 5604, 5605 and 5606 are disposed along the optical axis z in the plastic barrel 5200. The plastic barrel 5200 includes an object-end portion 5300, an image-end portion 5500 and a tube portion 5400. The object-end portion 5300 includes an outer object-end surface 5310 and an object-end opening 5311. The image-end portion 5500 includes an outer image-end surface 5530 and an image-end opening 5533. The tube portion 5400 connects the object-end portion 5300 and the image-end portion 5500, wherein the tube portion 5400 includes a plurality of inner parallel surfaces (their reference numerals are omitted), and the inner parallel surfaces are parallel to the optical axis z in FIG. 5A. At least one inner parallel surface 5420 of the inner parallel surfaces includes a plurality of stripe structures 5422. The stripe structures 5422 are slightly protruded on the inner parallel surface 5420 and regularly arranged along a circumferential direction of the inner parallel surface 5420. The stripe structures 5422 are disposed correspondingly to the outer diameter surface 150 of the annular optical element 100, that is, the inner parallel surface 5420 including the stripe structures 5422 is disposed correspondingly to the outer diameter surface 150. There may be small air gaps between the inner parallel surface 5420 and the outer diameter surface 150, and the inner parallel surface 5420 on which the stripe structures 5422 are disposed and the outer diameter surface 150 may be connected to each other.

In addition, the inner parallel surface 5420, on which the stripe structures 5422 are disposed, can be taken as the adjacent surface R applied in the 1st embodiment according to the present disclosure. Other details of the adjacent surface R and the inspection light L have been described in the foregoing paragraphs of the 1st embodiment and will not be described again herein. Therefore, it is favorable for inspecting the connecting condition between the outer diameter surface 150 of the annular optical element 100 and the stripe structures 5422 of the plastic barrel 5200 from the annular optical surface 181. Furthermore, when the annular optical element 100 is changed to be made of a black material, it is favorable for the inspection image (i.e. the image of the inspection light L observed on the annular optical surface 181) to be distinguishably shown on the annular optical surface 181 so as to increase the identification and inspection efficiency.

Specifically, the imaging lens module 5000 includes the optical lens assembly 5600, the annular optical element 100 and an image surface 5700, wherein a light passes through the optical lens assembly 5600 and images on the image surface 5700, a position of the image surface 5700 is provided for an image sensor (not shown herein) to be disposed on. The optical lens assembly 5600 includes the lens elements 5601, 5602, 5603, 5604, 5605 and 5606 in order from an object side to an image-side of the optical lens assembly 5600, wherein the optical lens assembly 5600 includes a total of six lens elements (5601, 5602, 5603, 5604, 5605 and 5606) and the annular optical element 100, which are disposed along the optical axis z in the plastic barrel 5200. The annular optical element 100 is a retainer, which is used for fixedly disposing the lens elements 5601, 5602, 5603, 5604, 5605, 5606 and other optical elements being located thereamong in the plastic barrel 5200 of the imaging lens module 5000. Furthermore, the annular optical element 100 is temporarily pressed by the pressing force F of the assembling jig while assembling the imaging lens module, and the adjusting structure 163 and the annular auxiliary surface 178 are advantageous in providing the structural strength to maintain the flatness and optical properties of the annular optical surface 181 and the annular reflecting surface 177.

The connecting surface 179 of the annular optical element 100 is for connecting to an element connecting surface 5696 of the lens element 5606, wherein both of the connecting surface 179 and the element connecting surface 5696 are vertical to the optical axis z.

Furthermore, the object-end portion 5300 is extended from a part of the plastic barrel 5200 for disposing the lens element 5601, being closest to the imaged object, towards the imaged object (the part of the plastic barrel 5200 for disposing the lens element 5601 is excluded from the object-end portion 5300). The image-end portion 5500 is extended from a part of the plastic barrel 5200 for disposing the annular optical element 100, being closest to the image surface 5700, towards the image surface 5700 (the part of the plastic barrel 5200 for disposing the annular optical element 100 is excluded from the image-end portion 5500). The tube portion 5400 is between the object-end portion 5300 and the image-end portion 5500 of the plastic barrel 5200.

Figure 5D:
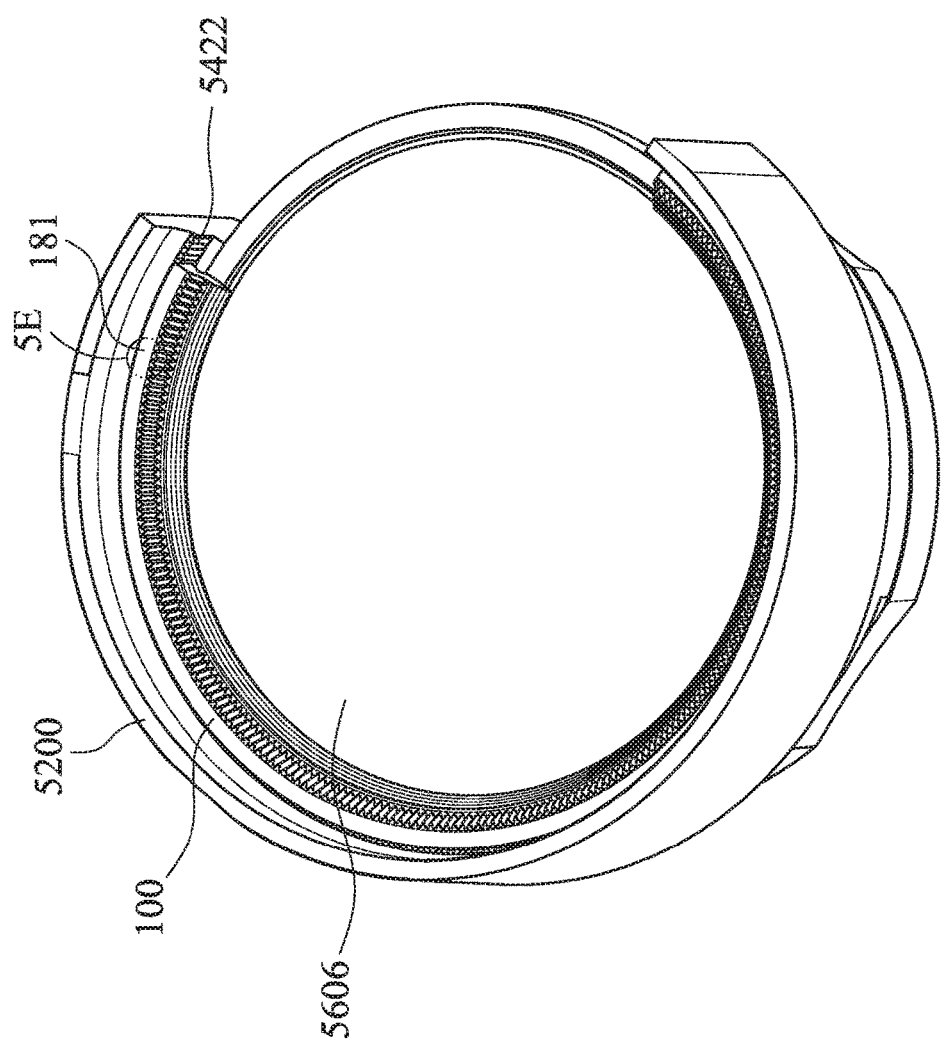
FIG. 5D is another partial three-dimensional view of the imaging lens module according to the 5th embodiment.

FIG. 5D is another partial three-dimensional view of the imaging lens module 5000 according to the 5th embodiment. In FIG. 5C and FIG. 5D, the inspection light L can be incident on the annular optical surface 181 to enter into the annular optical element 100, and then the inspection light L is reflected from the inner parallel surface 5420, on which the stripe structures 5422 are disposed, to the annular reflecting surface 177. Next, the inspection light L is totally reflected from the annular reflecting surface 177 to the annular optical surface 181, and the inspection image of the structural properties of the outer diameter surface 150 and the inner parallel surface 5420, on which the stripe structures 5422 are disposed, can be observed on the annular optical surface 181.

Figure 5F:
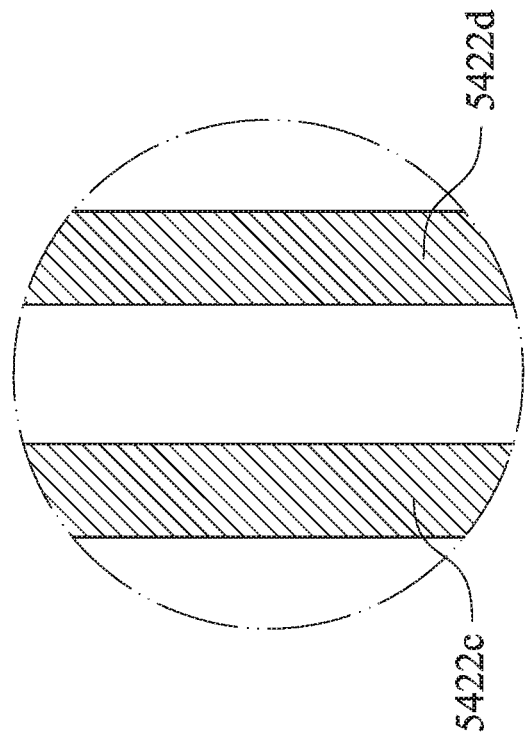
FIG. 5F is a schematic view of another inspection image of the imaging lens module according to the 5th embodiment.
Figure 5E:
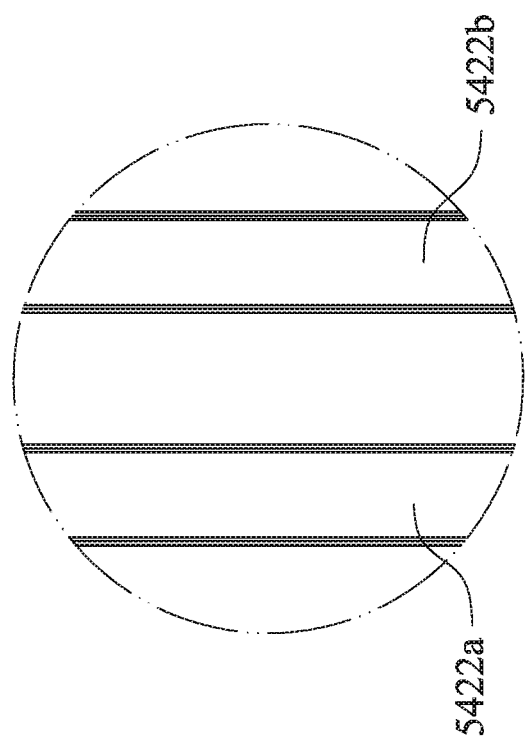
FIG. 5E is a schematic view of an inspection image of an inspection position 5E in FIG. 5D.

FIG. 5E is a schematic view of an inspection image of an inspection position 5E in FIG. 5D, and FIG. 5F is a schematic view of another inspection image of the imaging lens module 5000 according to the 5th embodiment. Each of the inspection images of FIG. 5E and FIG. 5F can be the inspection image observed on any one inspection position on the annular optical surface 181 (an inspection position in FIG. 5F is not shown herein), and shows the condition of being without glue dispensing between the inner parallel surface 5420 and the outer diameter surface 150, which are adjacent to or connected to each other.

FIG. 5E shows two stripe structure images 5422a and 5422b corresponding to two of stripe structures 5422 respectively, and it is the condition of the outer diameter surface 150 and the inner parallel surface 5420 with the stripe structures 5422 disposed thereon being not tightly contacting each other yet. The overall inspection image in FIG. 5E is bright, and the outlines of the stripe structure images 5422a and 5422b can be slightly observed.

FIG. 5F shows two stripe structure images 5422c and 5422d corresponding to two of stripe structures 5422 respectively, and it is the condition of the outer diameter surface 150 and the inner parallel surface 5420 with the stripe structures 5422 disposed thereon being tightly contacting each other. The stripe structure images 5422c and 5422d in FIG. 5F are dimmer and in black color (slash portions in the drawing), and the outlines of the stripe structure images 5422c and 5422d can be clearly observed. The part other than the stripe structure images 5422c and 5422d, which is an image of an air gap between the two stripe structures 5422 (not contacting the outer diameter surface 150), is brighter. FIG. 5F is corresponding to the condition that there is the air gap therebetween, and the part of the outer diameter surface 150 therebetween is not contact the inner parallel surface 5420 of the plastic barrel 5200.

Figure 5I:
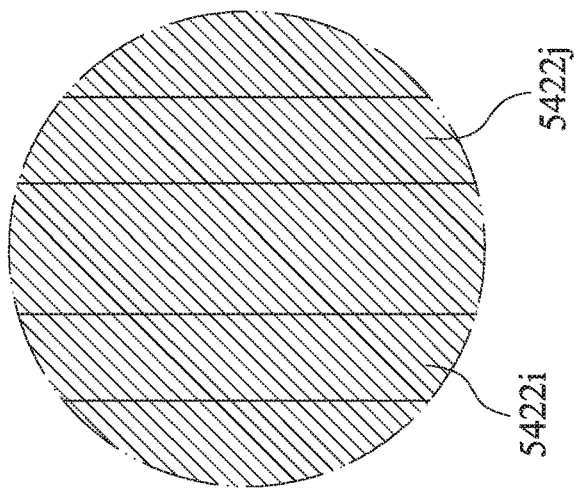
FIG. 5I is a schematic view of further another inspection image of the imaging lens module according to the 5th embodiment.
Figure 5H:
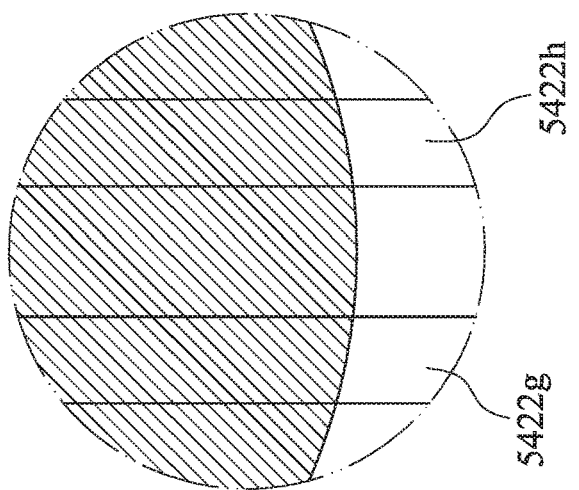
FIG. 5H is a schematic view of yet another inspection image of the imaging lens module according to the 5th embodiment.
Figure 5G:
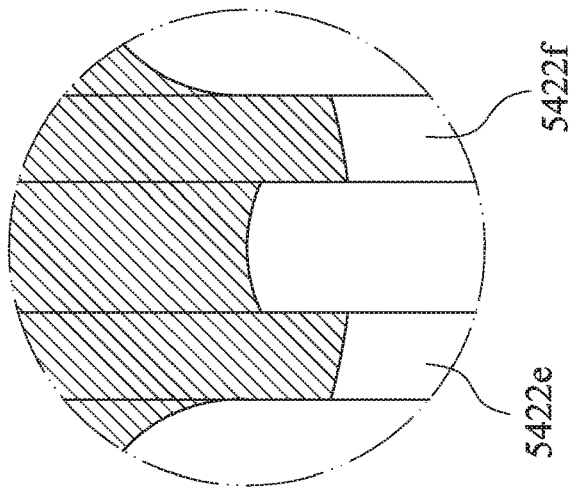
FIG. 5G is a schematic view of still another inspection image of the imaging lens module according to the 5th embodiment.

FIG. 5G to FIG. 5I are respectively three schematic views of the inspection images of the imaging lens module 5000 according to the 5th embodiment. Each of the inspection images of FIG. 5G to FIG. 5I can be the inspection image observed on any one inspection position on the annular optical surface 181 (inspection positions are not shown herein), and shows the condition of glue dispensing between the inner parallel surface 5420 and the outer diameter surface 150.

FIG. 5G shows two stripe structure images 5422e and 5422f corresponding to two of stripe structures 5422 respectively. Part of the inspection image in FIG. 5G is dimmer, and it is corresponding to the condition of part of the outer diameter surface 150 and the stripe structures 5422 being tightly contacting each other, Another part of the inspection image in FIG. 5G is brighter, and it is corresponding to the condition of another part of the outer diameter surface 150 contacting the air. According to FIG. 5G, the real assembling condition of the imaging lens module 5000 may be that the annular optical element 100 is tilted after assembling, and the stripe structures 5422 are not evenly pressed on the outer diameter surface 150, so that it is difficult to observe the completed and clear outlines of the stripe structure images 5422e and 5422f. Furthermore, an image between the stripe structure images 5422e and 5422f is dimmer, and it is corresponding to the condition that an air gap between the stripe structures 5422 is filled with the flowing glue material of a small amount.

FIG. 5H shows two stripe structure images 5422g and 5422h corresponding to two of stripe structures 5422 respectively. Part of the inspection image in FIG. 5H is dimmer, and it is corresponding to the condition of part of the outer diameter surface 150 and the stripe structures 5422 being tightly contacting each other. Another part of the inspection image in FIG. 5H is brighter, and it is corresponding to the condition of another part of the outer diameter surface 150 contacting the air. According to FIG. 5H, the real assembling condition of the imaging lens module 5000 may be that the annular optical element 100 is tilted after assembling, and the stripe structures 5422 are not evenly pressed on the outer diameter surface 150, so that it is difficult to observe the completed and clear outlines of the stripe structure images 5422g and 5422h. Furthermore, an image between the stripe structure images 5422g and 5422h is dimmer, and it is corresponding to the condition that an air gap between the stripe structures 5422 is filled with the flowing glue material of a more amount, even the flowing glue material may overflow between the stripe structures 5422 and the outer diameter surface 150.

FIG. 5I shows two stripe structure images 5422i and 5422j corresponding to two of stripe structures 5422 respectively. An entirety of the inspection image in FIG. 5I is dimmer, and it is corresponding to the condition of the outer diameter surface 150 and the stripe structures 5422 being tightly contacting each other. According to the outlines of the stripe structure images 5422i and 5422j being less clear in FIG. 5I, the real assembling condition of the imaging lens module 5000 may be that the tolerance of the outer diameter surface 150 is greater, so that the pressing force between the annular optical element 100 and the plastic barrel 5200 is greater after assembling. Furthermore, it is corresponding to the condition that an air gap between the stripe structures 5422 is filled with the flowing glue material of a great amount, even the flowing glue material may overflow between the stripe structures 5422 and the outer diameter surface 150. In addition, due to an entirety of the inspection image in FIG. 5I being dimmer and without any brighter part, it should be noticed if the pressing force of part therebetween is greater or the flowing glue material overflows. Accordingly, it should be followed by an observation of another inspection position on the annular optical surface 181 to determine the assembling quality of the annular optical element 100.

According to FIG. 5G to FIG. 5I, the annular optical element 100 of the present disclosure is advantageous in observing the assembling quality of the imaging lens module 5000 so as to enhance the appearance inspection efficiency to meet the production requirements. Furthermore, the inspection light L from a portion of the outer diameter surface 150 is corresponding to a portion of the inner parallel surface 5420, which is contacted or adjacent thereto, and thereby the connecting condition between the portion of the outer diameter surface 150 and the corresponding portion of the inner parallel surface 5420 can be completely observed. When the inner parallel surface 5420 and the outer diameter surface 150 have too different roundness and are tilted from each other, the portion of the outer diameter surface 150 even does not contact the corresponding portion of the inner parallel surface 5420, wherein an inspection image thereof would be different from an inspection image of other portion of the outer diameter surface 150 by observing on the annular optical surface 181. Therefore, it enables to determine if the outer diameter surface 150 and the inner parallel surface 5420 tightly contact everywhere. If there are too many portions without tight contact, it would be determined as an assembling fail so as to screen out the imaging lens module 5000 of assembling quality failure. Moreover, the acceptance criteria of the appearance or assembling quality of the imaging lens module 5000 can be defined via inspection images of four, six or other number inspection positions and the respective occurrence ratios of the inspection images in FIG. 5G to FIG. 5I.

In addition, the annular optical surface 181 featured with being flat can be transferred from a corresponding surface of the mold after a polish surface processing procedure. Thus, the connecting condition between the portion of the outer diameter surface 150 and the corresponding portion of the inner parallel surface 5420 being contacted or adjacent thereto can be completely observed without distortion. It is favorable for directly observing the inspection image on the annular optical surface 181 by the monitoring camera of the inspection equipment to determine assembling pass or fail of the imaging lens module 5000 so as to control the assembling quality of the imaging lens module 5000.

Given the above, regarding the assembling of the annular optical element and the plastic barrel, it is difficult to confirm the connecting condition between the inner parallel surface (or the inner surface of the plastic barrel) and the annular optical element (may be the retainer), and the filling condition of the flowing glue material, while there are assembling techniques of accurately glue dispensing for the imaging lens module today. However, according to the annular optical element of the present disclosure, it enables to directly observe the inspection image on the annular optical surface being bright or dim to determine if there are assembling failures of glue dispensing unevenly, dispensing too small amount, blocking of glue, tilt of the annular optical element, unevenly pressing force on the annular optical element and so on. It is favorable for supporting the review topics related to the shipment quality of the imaging lens module so as to improve the shipment quality. In addition, the inner parallel surface having the stripe structures of the plastic barrel is favorable for the determination of the inspection image. Further, when infrared light is used for the inspection light, it is advantageous in maintaining the black plastic material of both of the plastic barrel and the annular optical element instead of changing to transparent plastic material for the sake of the usage of the inspection light.

6th Embodiment

Figure 6A:
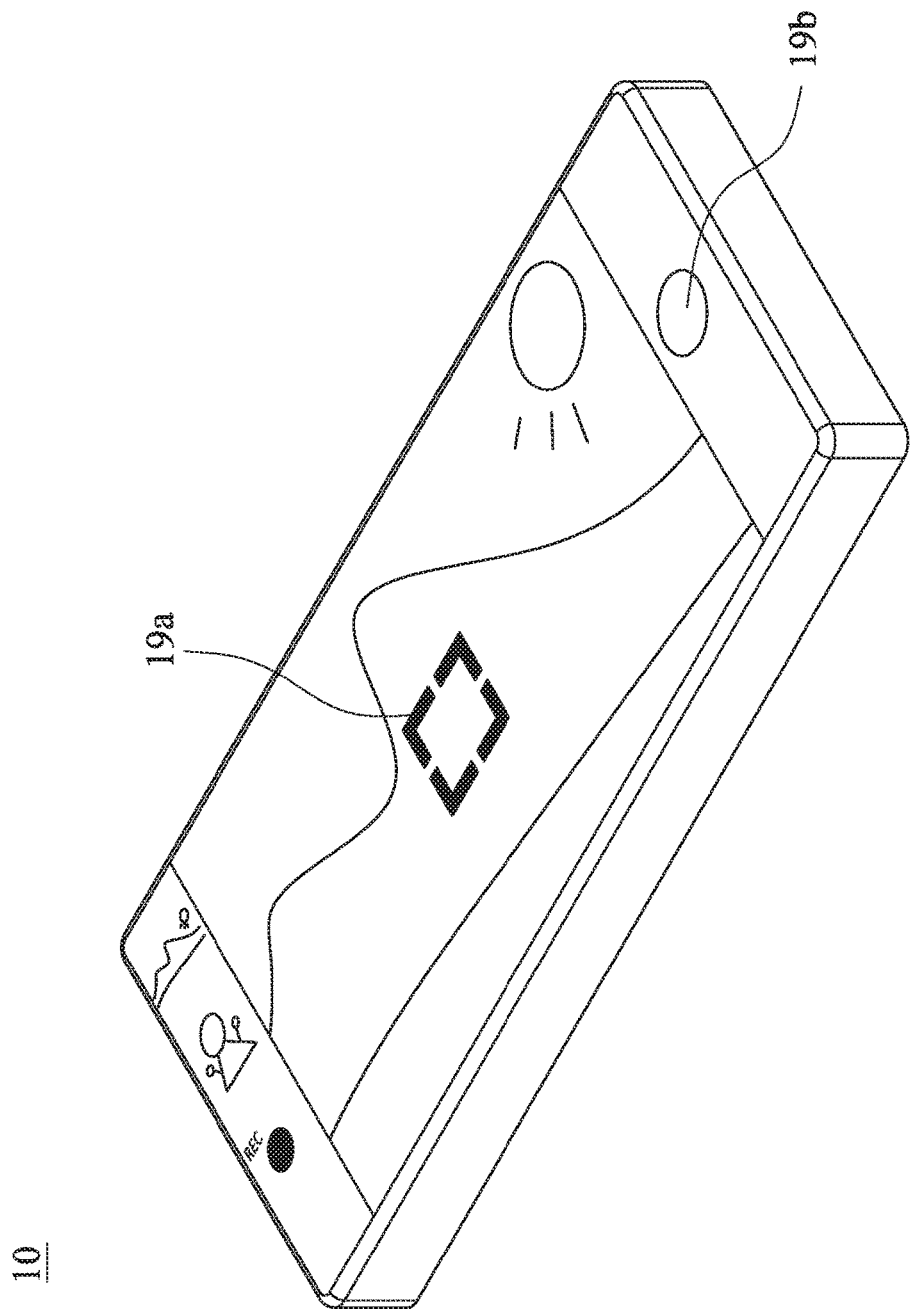
FIG. 6A shows a schematic view of an electronic device according to the 6th embodiment of the present disclosure.
Figure 6B:
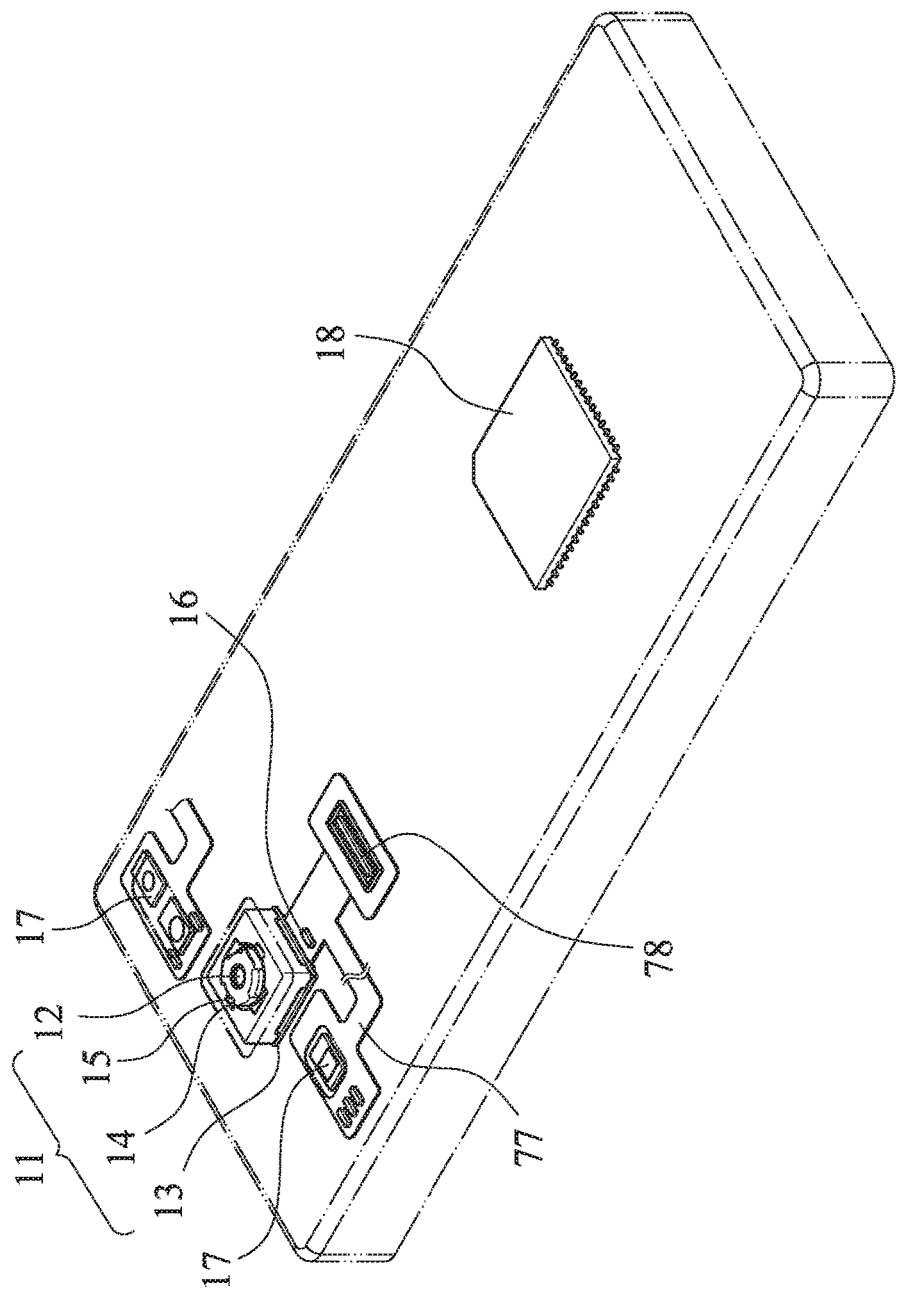
FIG. 6B shows another schematic view of the electronic device according to the 6th embodiment.

FIG. 6A shows a schematic view of an electronic device 10 according to the 6th embodiment of the present disclosure, FIG. 6B shows another schematic view of the electronic device 10 according to the 6th embodiment, and particularly, FIG. 6A and FIG. 6B are schematic views related to a camera of the electronic device 10. In FIG. 6A and FIG. 6B, the electronic device 10 of the 6th embodiment is a smart phone, wherein the electronic device 10 includes a camera module 11. The camera module 11 includes an imaging lens module 12 according to the present disclosure and an image sensor 13, wherein the image sensor 13 is disposed on an image surface (not shown in drawings) of the imaging lens module 12. Therefore, a better image quality can be achieved, and hence the high-end imaging requirements of modern electronic devices can be satisfied.

Furthermore, the user activates the capturing mode via a user interface 19 of the electronic device 10, wherein the user interface 19 of the 6th embodiment can be a touch screen 19a, a button 19b and etc. At this moment, the imaging light is converged on the image sensor 13 of the imaging lens module 12, and the electronic signal associated with image is output to an image signal processor (ISP) 18.

Figure 6C:
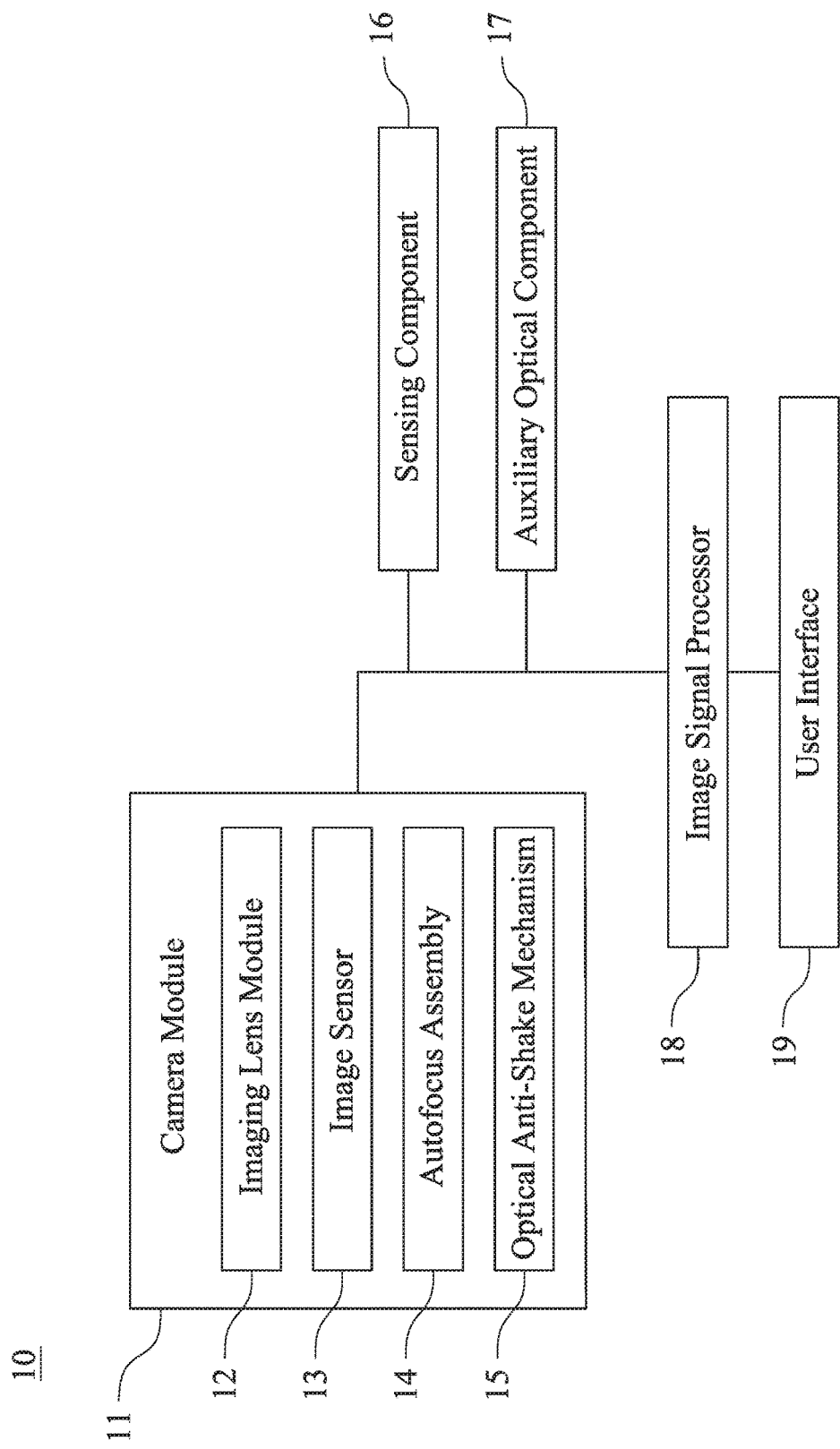
FIG. 6C shows a block diagram of the electronic device according to the 6th embodiment.

FIG. 6C shows a block diagram of the electronic device 10 according to the 6th embodiment, and in particular, the block diagram is related to the camera of the electronic device 10. In FIG. 6A to FIG. 6C, the camera module 11 can further include an autofocus assembly 14 and an optical anti-shake mechanism 15 based on the camera specification of the electronic device 10. Moreover, the electronic device 10 can further include at least one auxiliary optical component 17 and at least one sensing component 16. The auxiliary optical component 17 can be a flash module for compensating for the color temperature, an infrared distance measurement component, a laser focus module and etc. The sensing component 16 can have functions for sensing physical momentum and kinetic energy, and thereby can be an accelerator, a gyroscope, and a Hall effect element, to sense shaking or jitters applied by hands of the user or external environments. Accordingly, the functions of the autofocus assembly 14 and the optical anti-shake mechanism 15 of the camera module 11 can be aided and enhanced to achieve the superior image quality. Furthermore, the electronic device 10 according to the present disclosure can have a capturing function with multiple modes, such as taking optimized selfies, high dynamic range (HDR) under a low light condition, 4K resolution recording, etc. Additionally, the user can visually see the captured image of the camera through the touch screen 19a and manually operate the view finding range on the touch screen 19a to achieve the auto focus function of what you see is what you get.

Furthermore, in FIG. 6B, the camera module 11, the sensing component 16 and the auxiliary optical component 17 can be disposed on a flexible printed circuit board (FPC) 77 and electrically connected with the associated components, such as the imaging signal processor 18, via a connector 78 to perform a capturing process. Since the current electronic devices, such as smart phones, have a tendency of being compact, the way of firstly disposing the camera module and related components on the flexible printed circuit board and secondly integrating the circuit thereof into the main board of the electronic device via the connector can satisfy the requirements of the mechanical design and the circuit layout of the limited space inside the electronic device, and obtain more margins. The autofocus function of the camera module can also be controlled more flexibly via the touch screen of the electronic device. In the 6th embodiment, the electronic device 10 includes a plurality of sensing components 16 and a plurality of auxiliary optical components 17. The sensing components 16 and the auxiliary optical components 17 are disposed on the flexible printed circuit board 77 and at least one other flexible printed circuit board (its reference numeral is omitted) and electrically connected with the associated components, such as the image signal processor 18, via corresponding connectors to perform the capturing process. In other embodiments (not shown herein), the sensing components and the auxiliary optical components can also be disposed on the main board of the electronic device or carrier boards of other types according to requirements of the mechanical design and the circuit layout.

In addition, the electronic device 10 can further include but not be limited to a wireless communication unit, a control unit, a storage unit, a random access memory, a read-only memory, or a combination thereof.

7th Embodiment

Figure 7:
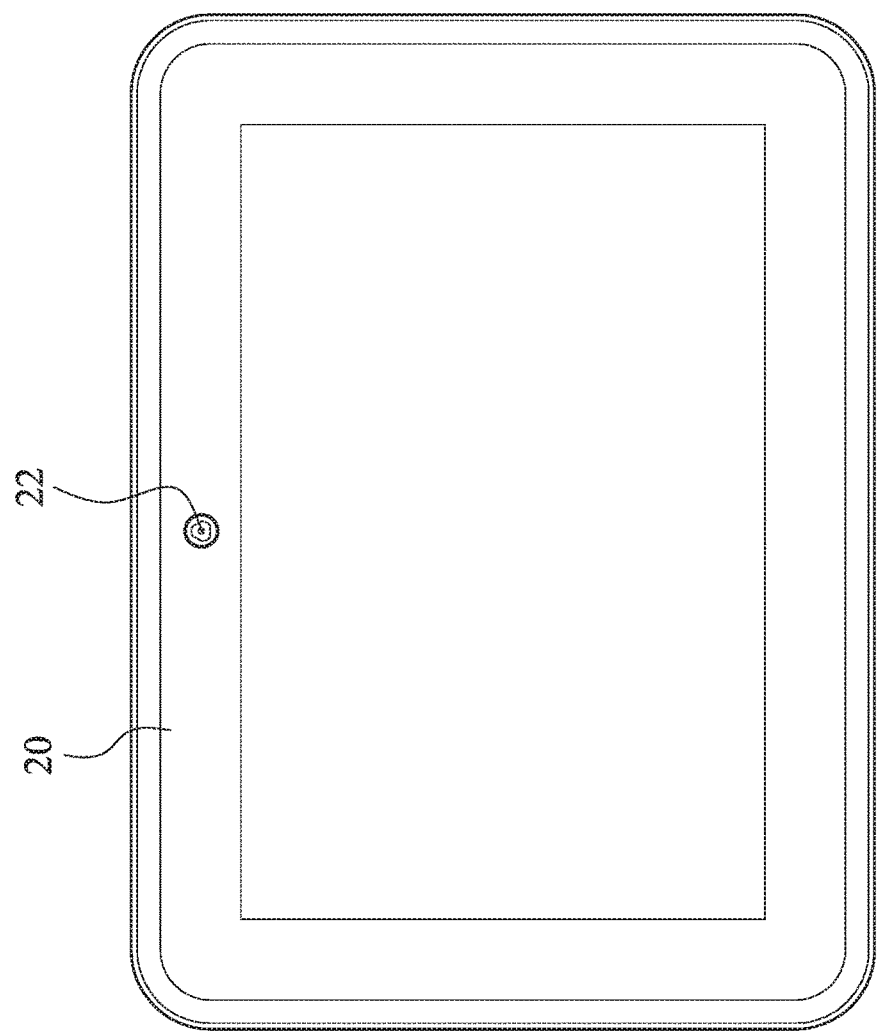
FIG. 7 shows an electronic device according to the 7th embodiment of the present disclosure.

FIG. 7 shows an electronic device 20 according to the 7th embodiment of the present disclosure. The electronic device 20 of the 7th embodiment is a tablet personal computer. The electronic device 20 includes an imaging lens module 22 according to the present disclosure.

8th Embodiment

Figure 8:
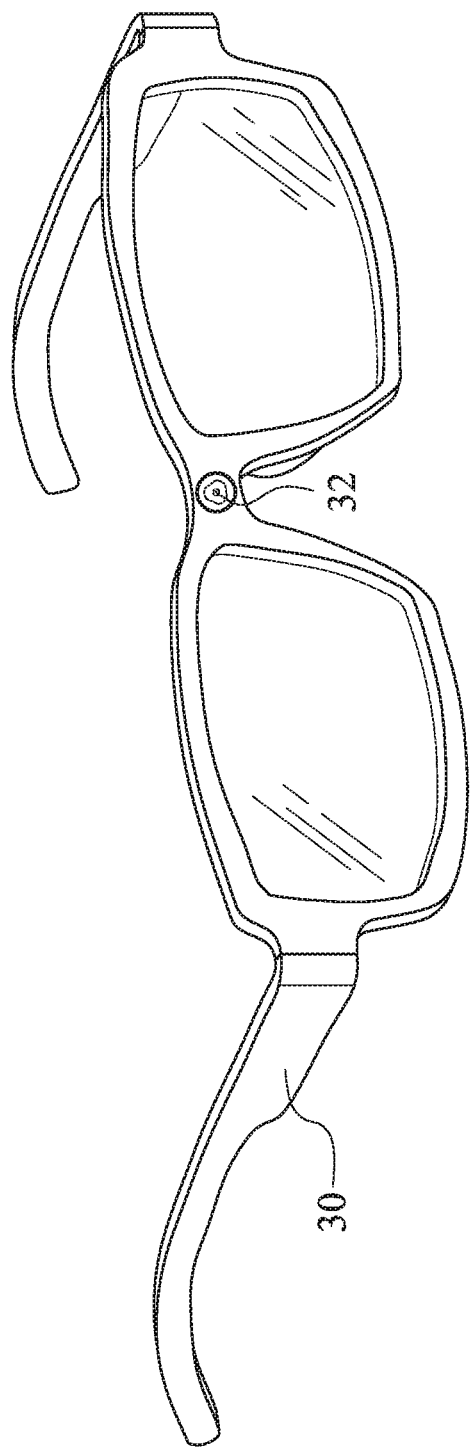
FIG. 8 shows an electronic device according to the 8th embodiment of the present disclosure.

FIG. 8 shows an electronic device 30 according to the 8th embodiment of the present disclosure. The electronic device 30 of the 8th embodiment is a wearable device. The electronic device 30 includes an imaging lens module 32 according to the present disclosure.

The foregoing description, for purpose of explanation, has been described with reference to specific embodiments. It is to be noted that Tables show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An annular optical element, having an optical axis and comprising:
    an outer diameter surface surrounding the optical axis;
    an inner annular surface surrounding the optical axis and forming a central hole;
    an object-side surface connecting the outer diameter surface and the inner annular surface, wherein the object-side surface comprises:
        an annular reflecting surface inclined with the optical axis;
        an annular auxiliary surface, wherein the annular auxiliary surface is closer to the optical axis than the annular reflecting surface is to the optical axis; and
        a connecting surface for connecting to an optical element, wherein the connecting surface is closer to the optical axis than the annular auxiliary surface is to the optical axis; and
    an image-side surface connecting the outer diameter surface and the inner annular surface, wherein the image-side surface is located opposite to the object-side surface and comprises an annular optical surface;
    wherein a V-shaped groove is formed by the annular auxiliary surface and the annular reflecting surface of the object-side surface, an angle between the annular auxiliary surface and the annular reflecting surface is da, and the following condition is satisfied:

39 degrees<$da$<89 degrees.

2. The annular optical element of claim 1, wherein the annular optical element with the annular reflecting surface and the annular optical surface is formed integrally and made by an injection molding method.

3. The annular optical element of claim 2, wherein an angle between the annular optical surface and the annular reflecting surface is θ1, and the following condition is satisfied:

31 degrees<$θ1$<55 degrees.

4. The annular optical element of claim 2, wherein an angle between the annular reflecting surface and the outer diameter surface is θ2, and the following condition is satisfied:

31 degrees<$θ2$<60 degrees.

5. The annular optical element of claim 2, wherein a refractive index of the annular optical element for a light with a wavelength of 587.6 nm is nd, and the following condition is satisfied:

1.42<$nd$<1.68.

6. The annular optical element of claim 2, wherein an Abbe number of the annular optical element is Vd, and the following condition is satisfied:

15<$Vd$<35.

7. The annular optical element of claim 4, wherein the angle between the annular reflecting surface and the outer diameter surface is θ2, a critical angle of the annular optical element for a light with a wavelength of 780 nm is θc1, and the following condition is satisfied:

θ2>$θc1$.

8. The annular optical element of claim 7, wherein the annular optical element is made of a black plastic material and transparent to an infrared light.

9. The annular optical element of claim 7, wherein the annular optical element is made of a transparent and colorless plastic material, and transparent to a visible light.

10. The annular optical element of claim 2, wherein the V-shaped groove is tapered from the object-side surface towards the image-side surface.

11. The annular optical element of claim 2, wherein the inner annular surface comprises an adjusting structure extended towards the image-side surface, the adjusting structure is closer to the optical axis than the annular optical surface is to the optical axis, an angle between the adjusting structure and the optical axis is da2, and the following condition is satisfied:

13 degrees<$da2$<45 degrees.

12. The annular optical element of claim 2, wherein the annular optical surface has a specular property, a surface roughness of the annular optical surface is Ra1, and the following condition is satisfied:

0.005$a$≤$Ra1$<0.06$a$.

13. The annular optical element of claim 2, wherein the annular reflecting surface has a specular property, a surface roughness of the annular reflecting surface is Ra2, and the following condition is satisfied:

0.005$a$≤$Ra2$<0.05$a$.

14. The annular optical element of claim 2, wherein the outer diameter surface has a specular property, a surface roughness of the outer diameter surface is Ra3, and the following condition is satisfied:

0.005$a$≤$Ra3$<0.05$a$.

15. The annular optical element of claim 2, wherein the annular optical surface is provided for an inspection light to transmit therethrough, and the annular reflecting surface is provided for the inspection light to be reflected from the annular reflecting surface to the outer diameter surface.

16. The annular optical element of claim 2, wherein the annular reflecting surface is provided for an inspection light to be totally reflected therefrom.

17. The annular optical element of claim 11, wherein a vertical parting molding structure is located between the annular optical surface and the adjusting structure.

18. The annular optical element of claim 11, wherein the adjusting structure comprises a plurality of strip-shaped structures extended from the object-side surface towards the image-side surface.

19. The annular optical element of claim 18, wherein each of the strip-shaped structures has a wedge shape.

20. The annular optical element of claim 18, wherein a number of the strip-shaped structures is N1, and the following condition is satisfied:

$$60 < N1 < 400.$$

21. The annular optical element of claim 19, wherein each of the strip-shaped structures has a specular property, a surface roughness of each of the strip-shaped structures is Ra4, and the following condition is satisfied:

$$0.005a \leq Ra4 < 0.05a.$$

22. An imaging lens module, comprising:
the annular optical element of claim 1;
an optical lens assembly comprising a plurality of lens elements; and
a plastic barrel, wherein the lens elements are disposed along the optical axis in the plastic barrel, and the plastic barrel comprises:
    an object-end portion comprising an outer object-end surface and an object-end opening;
    an image-end portion comprising an outer image-end surface and an image-end opening; and
    a tube portion connecting the object-end portion and the image-end portion, wherein the tube portion comprises a plurality of inner parallel surfaces, at least one of the inner parallel surfaces comprises a plurality of stripe structures, the stripe structures are regularly arranged along a circumferential direction of the inner parallel surface, and the stripe structures are disposed correspondingly to the outer diameter surface of the annular optical element.

23. An electronic device, comprising:
the imaging lens module of claim 22.

* * * * *